US012515302B2

(12) United States Patent
Kukucka et al.

(10) Patent No.: US 12,515,302 B2
(45) **Date of Patent: *Jan. 6, 2026**

(54) ANTI-SLIP FASTENER REMOVER TOOL

(71) Applicant: Grip Holdings LLC, Brandon, FL (US)

(72) Inventors: Paul Kukucka, Brandon, FL (US); Thomas Stefan Kukucka, Brandon, FL (US)

(73) Assignee: Grip Holdings LLC, Brandon, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,682

(22) Filed: May 24, 2023

(65) Prior Publication Data

US 2023/0321801 A1 Oct. 12, 2023

Related U.S. Application Data

(63) Continuation-in-part of application No. 17/873,717, filed on Jul. 26, 2022, now Pat. No. 11,701,757, (Continued)

(51) Int. Cl.
*B25B 23/10* (2006.01)
*B25B 13/06* (2006.01)
(Continued)

(52) U.S. Cl.
CPC ............ *B25B 23/108* (2013.01); *B25B 27/18* (2013.01); *B25B 13/065* (2013.01); *B25B 15/008* (2013.01)

(58) Field of Classification Search
CPC . B25B 15/005; B25B 15/008; B25B 23/0035; B25B 23/0057; B25B 23/108;
(Continued)

(56) References Cited

U.S. PATENT DOCUMENTS 1,798,944 A 3/1931 Jackman
2,969,250 A 1/1961 Kull
(Continued)

FOREIGN PATENT DOCUMENTS

AU 201612229 4/2016
AU 201612720 6/2016
(Continued)

*Primary Examiner* — Brian D Keller
*Assistant Examiner* — Alberto Saenz

(57) ABSTRACT

An anti-slip fastener remover tool includes a torque-tool body, a plurality of paired engagement features, and a plurality of intersection points. The plurality of paired engagement features that grips the lateral surface of the stripped fastener head is radially positioned around a rotation axis of the torque-tool body. The torque-tool body is inwardly extended from an outer wall of the torque-tool body to the plurality of paired engagement features. Each paired engagement feature comprises a first engagement feature and a second engagement feature. The first engagement feature and the second engagement feature each comprise a bracing section, a cavity section, and a connector section. The cavity sections of the first and second engagement features are adjacently connected to each other. The bracing sections of the first and second engagement feature are oppositely positioned about the cavity sections of the first and second engagement features.

20 Claims, 20 Drawing Sheets

Related U.S. Application Data which is a continuation-in-part of application No. 17/231,530, filed on Apr. 15, 2021, now Pat. No. 11,396,089, which is a continuation-in-part of application No. 16/548,470, filed on Aug. 22, 2019, now Pat. No. 11,045,925, which is a continuation-in-part of application No. 16/107,842, filed on Aug. 21, 2018, now Pat. No. 10,780,556, which is a continuation-in-part of application No. 15/650,768, filed on Jul. 14, 2017, now Pat. No. 10,081,094.

(60) Provisional application No. 62/475,757, filed on Mar. 23, 2017.

(51) Int. Cl.
*B25B 27/18* (2006.01)
*B25B 15/00* (2006.01)

(58) Field of Classification Search
CPC ....... B25B 13/00; B25B 13/06; B25B 13/065; B25B 13/58; B25B 27/18
USPC ............. 81/53.2, 121.1, 124.3, 124.4, 124.6, 81/124.7, 125, 186, 461
See application file for complete search history.

(56) References Cited

U.S. PATENT DOCUMENTS

| | | | |
|---|---|---|---|
| 3,405,377 A | | 10/1968 | Pierce |
| 3,495,485 A | | 2/1970 | Knudsen et al. |
| 3,902,384 A | | 9/1975 | Ehrler |
| 3,908,489 A | | 9/1975 | Yamamoto et al. |
| 3,913,427 A | | 10/1975 | Brase |
| 4,074,597 A | | 2/1978 | Jansson |
| 4,536,115 A | | 8/1985 | Helderman |
| 4,598,616 A | | 7/1986 | Colvin |
| 4,607,547 A | | 8/1986 | Martus |
| 4,651,596 A | | 3/1987 | Rachanski |
| 4,893,530 A | | 1/1990 | Warheit |
| 4,927,020 A | | 5/1990 | Randy |
| 4,930,378 A | | 6/1990 | Colvin |
| 5,019,080 A | | 5/1991 | Hemer |
| 5,031,487 A | | 7/1991 | Polonsky |
| 5,219,392 A | | 6/1993 | Ruzicka et al. |
| 5,228,570 A | | 7/1993 | Robinson |
| 5,251,521 A | | 10/1993 | Burda et al. |
| 5,398,823 A | | 3/1995 | Anders |
| 5,481,948 A | | 1/1996 | Zerkovitz |
| 5,501,342 A | | 3/1996 | Geibel |
| 5,519,929 A | | 5/1996 | Bleckman |
| 5,645,177 A | | 7/1997 | Lin |
| 5,649,791 A | | 7/1997 | Connolly |
| 5,669,516 A | | 9/1997 | Horn |
| 5,725,107 A | | 3/1998 | Dembicks |
| 5,737,981 A | | 4/1998 | Hildebrand |
| 5,743,394 A | | 4/1998 | Martin |
| 5,782,148 A | * | 7/1998 | Kerkhoven ............ B25B 13/06 81/186 |
| 5,829,327 A | | 11/1998 | Stanton |
| 5,832,792 A | | 11/1998 | Hsieh |
| 5,868,049 A | | 2/1999 | Kanwal |
| 5,873,290 A | | 2/1999 | Chaconas |
| 5,904,076 A | | 5/1999 | Siwy |
| 6,009,778 A | | 1/2000 | Hsieh |
| 6,079,299 A | | 6/2000 | Sundstrom |
| 6,092,279 A | | 7/2000 | Shoup |
| 6,164,171 A | | 12/2000 | Kaneko et al. |
| 6,352,011 B1 | | 3/2002 | Frühm |
| 6,431,373 B1 | | 8/2002 | Blick |
| 6,575,057 B1 | | 6/2003 | Ploeger |
| 6,626,067 B1 | | 9/2003 | Iwinski |
| 6,698,316 B1 | | 3/2004 | Wright |
| 6,729,208 B1 | | 5/2004 | Chrzanowski |
| 6,755,098 B2 | | 6/2004 | Huang |
| 6,761,089 B2 | | 7/2004 | Bergamo |
| 6,857,340 B2 | | 2/2005 | Wagner |
| 6,951,156 B2 | | 10/2005 | Garg |
| 7,000,501 B1 | | 2/2006 | Chen |
| D524,615 S | | 7/2006 | Albertson |
| 7,137,514 B1 | | 11/2006 | Nickipuck |
| 7,225,710 B2 | | 6/2007 | Pacheco, Jr. |
| 7,331,260 B2 | | 2/2008 | Cheng |
| 7,434,494 B1 | | 10/2008 | Snider |
| D614,931 S | | 5/2010 | Su |
| 7,717,278 B2 | | 5/2010 | Kao |
| 7,788,994 B2 | | 9/2010 | Wright et al. |
| 7,814,814 B2 | | 10/2010 | Whitehead |
| 7,841,480 B2 | | 11/2010 | Hsieh |
| 7,913,593 B2 | | 3/2011 | Dahar et al. |
| 8,166,851 B2 | | 5/2012 | Pchola |
| 8,302,255 B2 | | 11/2012 | Lin |
| 8,336,709 B1 | | 12/2012 | Geibel |
| 9,132,533 B2 | | 9/2015 | Lesche et al. |
| D745,814 S | | 12/2015 | Hsieh |
| D776,505 S | | 1/2017 | Doroslovac |
| D784,106 S | | 4/2017 | Doroslovac |
| 9,687,968 B2 | | 6/2017 | Doroslovac et al. |
| D794,405 S | | 8/2017 | Doroslovac et al. |
| 9,718,170 B2 | | 8/2017 | Eggert et al. |
| D798,682 S | | 10/2017 | Doroslovac et al. |
| 9,873,195 B1 | | 1/2018 | Buxton |
| 9,878,441 B1 | | 1/2018 | Kao |
| D829,069 S | | 9/2018 | Doroslovac et al. |
| 10,081,094 B2 | | 9/2018 | Doroslovac et al. |
| 10,328,554 B2 | | 6/2019 | Todd |
| D859,944 S | | 9/2019 | Kukucka et al. |
| D859,945 S | | 9/2019 | Kukucka et al. |
| D859,946 S | | 9/2019 | Kukucka et al. |
| D859,947 S | | 9/2019 | Kukucka et al. |
| D867,841 S | | 11/2019 | Kukucka et al. |
| D868,553 S | | 12/2019 | Kukucka et al. |
| 10,493,519 B2 | | 12/2019 | Ross |
| D879,577 S | | 3/2020 | Kukucka et al. |
| D880,968 S | | 4/2020 | Kukucka et al. |
| D880,977 S | | 4/2020 | Kukucka et al. |
| D885,149 S | | 5/2020 | Kukucka et al. |
| D887,233 S | | 6/2020 | Kukucka et al. |
| D887,711 S | | 6/2020 | Kukucka et al. |
| D889,224 S | | 7/2020 | Kukucka et al. |
| D889,257 S | | 7/2020 | Kukucka et al. |
| D892,578 S | | 8/2020 | Kukucka et al. |
| 10,780,556 B2 | | 9/2020 | Kukucka et al. |
| 10,786,890 B2 | | 9/2020 | Kukucka et al. |
| D899,091 S | | 10/2020 | Kukucka et al. |
| 10,828,766 B2 | | 11/2020 | Kukucka et al. |
| D904,152 S | | 12/2020 | Kukucka et al. |
| D906,781 S | | 1/2021 | Kukucka et al. |
| 10,882,162 B2 | | 1/2021 | Kukucka et al. |
| D909,842 S | | 2/2021 | Kukucka et al. |
| D910,490 S | | 2/2021 | Lim et al. |
| 10,919,133 B2 | | 2/2021 | Kukucka et al. |
| 10,967,488 B2 | | 4/2021 | Kukucka et al. |
| 11,045,925 B2 | | 6/2021 | Kukucka et al. |
| 11,154,969 B2 | | 10/2021 | Kukucka et al. |
| 2003/0209111 A1 | | 11/2003 | Huang |
| 2004/0256263 A1 | | 12/2004 | Shih |
| 2005/0098459 A1 | | 5/2005 | Gorman |
| 2005/0103664 A1 | | 5/2005 | Shih |
| 2005/0183548 A1 | | 8/2005 | Horobec |
| 2005/0194330 A1 | | 9/2005 | Ziske |
| 2005/0257357 A1 | | 11/2005 | Huang |
| 2005/0274233 A1 | | 12/2005 | Lin |
| 2006/0130618 A1 | | 6/2006 | Hsieh |
| 2006/0156869 A1 | | 7/2006 | Hsieh |
| 2006/0266168 A1 | | 11/2006 | Pacheco |
| 2007/0005070 A1 | | 1/2007 | Kay et al. |
| 2007/0261519 A1 | | 11/2007 | Cheng |
| 2008/0066580 A1 | | 3/2008 | Putney et al. |
| 2008/0235930 A1 | | 10/2008 | English |
| 2009/0007732 A1 | | 1/2009 | Hsieh |
| 2009/0120885 A1 | | 5/2009 | Kao |
| 2009/0220321 A1 | | 9/2009 | Sakamura |
| 2010/0037737 A1 | | 2/2010 | Pchola |

(56) References Cited

U.S. PATENT DOCUMENTS

| | | | |
|---|---|---|---|
| 2010/0064863 | A1 | 3/2010 | Kozak |
| 2010/0065520 | A1 | 3/2010 | Hsieh |
| 2011/0056339 | A1 | 3/2011 | Su |
| 2011/0303052 | A1 | 12/2011 | Chen |
| 2012/0060656 | A1 | 3/2012 | Chang |
| 2012/0132039 | A1 | 5/2012 | Su |
| 2012/0210826 | A1 | 8/2012 | Stawarski |
| 2013/0047798 | A1 | 2/2013 | Huang |
| 2013/0160616 | A1 | 6/2013 | Hughes et al. |
| 2013/0213193 | A1 | 8/2013 | Lukes |
| 2013/0263706 | A1 | 10/2013 | Safar |
| 2014/0260832 | A1 | 9/2014 | Hsiao |
| 2014/0311302 | A1 | 10/2014 | Taguchi et al. |
| 2014/0331826 | A1 | 11/2014 | Campbell |
| 2014/0360321 | A1 | 12/2014 | Steinweg et al. |
| 2015/0135910 | A1 | 5/2015 | Eggert et al. |
| 2015/0266169 | A1 | 9/2015 | Campbell, II |
| 2015/0314429 | A1 | 11/2015 | Doroslovac |
| 2015/0321332 | A1 | 11/2015 | Lee |
| 2016/0046008 | A1 | 2/2016 | Thomas |
| 2016/0067853 | A1 | 3/2016 | Neto |
| 2016/0136792 | A1 | 5/2016 | Harp |
| 2016/0223005 | A1 | 8/2016 | Rathmann |
| 2016/0271764 | A1 | 9/2016 | Huang |
| 2016/0339564 | A1 | 11/2016 | Chen |
| 2017/0028538 | A1 | 2/2017 | Lourenco et al. |
| 2017/0246733 | A1 | 8/2017 | Shehab |
| 2017/0252905 | A1 | 9/2017 | Doroslovac et al. |
| 2017/0282337 | A1 | 10/2017 | Johnson et al. |
| 2017/0312839 | A1 | 11/2017 | Moss et al. |
| 2017/0312897 | A1 | 11/2017 | Doroslovac et al. |
| 2018/0001450 | A1 | 1/2018 | Anderson |
| 2018/0003241 | A1 | 1/2018 | Goss |
| 2018/0141192 | A1 | 5/2018 | Chang |
| 2018/0354022 | A1 | 12/2018 | Ross et al. |
| 2018/0354102 | A1 | 12/2018 | Kukucka et al. |
| 2019/0001469 | A1 | 1/2019 | Cho et al. |
| 2019/0015961 | A1 | 1/2019 | Kukucka et al. |
| 2019/0152033 | A1 | 5/2019 | Kukucka et al. |
| 2019/0217449 | A1 | 7/2019 | Lee |
| 2019/0283233 | A1 | 9/2019 | Kukucka et al. |
| 2019/0337131 | A1 | 11/2019 | Kukucka et al. |
| 2019/0375077 | A1 | 12/2019 | Kukucka et al. |
| 2020/0070321 | A1 | 3/2020 | Schulz |
| 2020/0078908 | A1 | 3/2020 | Wu et al. |
| 2020/0269398 | A1 | 8/2020 | Donovan |
| 2020/0298380 | A1 | 9/2020 | Doroslovac et al. |
| 2020/0376648 | A1 | 12/2020 | Kukucka et al. |
| 2020/0391360 | A1 | 12/2020 | Kukucka et al. |
| 2021/0039245 | A1 | 2/2021 | Kukucka et al. |

FOREIGN PATENT DOCUMENTS

| | | | |
|---|---|---|---|
| AU | 201612721 | | 6/2016 |
| CA | 2564093 | A1 | 4/2007 |
| CA | 168071 | | 12/2016 |
| CA | 2898480 | A1 | 7/2017 |
| CA | 3126890 | A1 | 7/2020 |
| CN | 2767068 | Y | 3/2006 |
| CN | 3630254 | | 6/2006 |
| CN | 201046555 | Y | 4/2008 |
| CN | 101208181 | A | 6/2008 |
| CN | 102395447 | | 3/2012 |
| CN | 102554833 | A | 7/2012 |
| CN | 103639950 | A | 3/2014 |
| CN | 204186727 | U | 3/2015 |
| CN | 303924849 | | 11/2016 |
| CN | 303956827 | | 12/2016 |
| CN | 303984883 | | 12/2016 |
| CN | 207548606 | U | 6/2018 |
| DE | 3911409 | A1 | 10/1990 |
| DE | 9403220 | U1 | 4/1994 |
| DE | 4321325 | A1 | 1/1995 |
| DE | 29613327 | U1 | 9/1996 |
| DE | 10321284 | A1 | 12/2004 |
| DE | 202010006146 | U1 | 7/2010 |
| DE | 202012103034 | | 11/2012 |
| DE | 102012104298 | A1 | 11/2013 |
| DE | 102013021238 | A1 | 6/2015 |
| EP | 0930132 | A2 | 7/1999 |
| EP | 0930132 | A3 | 11/2000 |
| EP | 1371453 | A2 | 12/2003 |
| EP | 1731774 | A1 | 12/2006 |
| EP | 0930132 | B1 | 4/2007 |
| EP | 2363245 | | 9/2011 |
| EP | 2363245 | A2 | 9/2011 |
| EP | 2363245 | A3 | 7/2015 |
| GB | 906839 | A | 9/1962 |
| GB | 1294764 | A | 11/1972 |
| GB | 2366532 | A | 3/2002 |
| JP | H06-15580 | | 1/1994 |
| JP | H0737805 | | 4/1995 |
| JP | 2011143522 | | 7/2011 |
| JP | 2012157913 | | 10/2011 |
| JP | 2014100742 | | 6/2014 |
| JP | 2017042898 | A | 3/2017 |
| JP | 2015180835 | A | 7/2017 |
| KR | 200149097 | Y1 | 7/1999 |
| RU | 2152870 | C1 | 7/2000 |
| RU | 2225786 | C2 | 1/2001 |
| RU | 45671 | U1 | 5/2005 |
| RU | 58510 | U1 | 11/2006 |
| RU | 2387533 | C1 | 4/2010 |
| RU | 116398 | | 5/2012 |
| RU | 180548 | U1 | 6/2018 |
| SU | 16616 | A1 | 8/1930 |
| TW | 201341127 | A | 10/2013 |
| TW | 201617181 | A | 5/2016 |
| TW | 201813785 | A | 4/2018 |
| TW | 201829135 | A | 8/2018 |
| WO | 9416862 | A | 8/1994 |
| WO | 1994016862 | A1 | 8/1994 |
| WO | 1996010932 | A1 | 4/1996 |
| WO | 1996026870 | A1 | 9/1996 |
| WO | 1996027745 | A1 | 9/1996 |
| WO | 1997010926 | A1 | 3/1997 |
| WO | 1998012982 | A1 | 4/1998 |
| WO | 999032264 | | 7/1999 |
| WO | 1999032264 | A1 | 7/1999 |
| WO | 2001066312 | A1 | 9/2001 |
| WO | 2004002687 | A1 | 1/2004 |
| WO | 2005070621 | | 8/2005 |
| WO | 2006023374 | | 3/2006 |
| WO | 2006130490 | A | 12/2006 |
| WO | 2006130490 | A1 | 12/2006 |
| WO | 2010007402 | A1 | 1/2010 |
| WO | 2011109040 | A1 | 9/2011 |
| WO | 2013028875 | A1 | 2/2013 |
| WO | 2015013246 | A | 1/2015 |
| WO | 2015082283 | A1 | 6/2015 |
| WO | 2015050942 | A1 | 9/2015 |
| WO | 2016005180 | A | 1/2016 |
| WO | 2016051080 | A1 | 4/2016 |
| WO | DM/090809 | | 4/2016 |
| WO | DM/091188 | | 5/2016 |
| WO | DM/091189 | | 5/2016 |
| WO | 2016174615 | A1 | 11/2016 |
| WO | WO2017069953 | A1 | 4/2017 |
| WO | 2017178997 | | 10/2017 |
| WO | 2017187388 | A1 | 11/2017 |
| WO | 2018150360 | A1 | 8/2018 |
| WO | 2018172831 | | 9/2018 |
| WO | 2019012486 | | 1/2019 |
| WO | 2019167032 | | 9/2019 |
| WO | 2019175652 | | 9/2019 |
| WO | 2020039281 | | 2/2020 |
| WO | 2020039285 | | 2/2020 |
| WO | 2020058777 | | 3/2020 |
| WO | 2020152516 | | 7/2020 |
| WO | 2020208608 | | 10/2020 |
| WO | 2020225800 | | 11/2020 |
| WO | 2021001696 | | 1/2021 |

(56) References Cited

FOREIGN PATENT DOCUMENTS

| | | | |
|---|---|---|---|
| WO | 2021019500 | | 2/2021 |
| WO | 2021033152 | | 2/2021 |
| WO | 2022047236 | A1 | 3/2022 |

* cited by examiner

ANTI-SLIP FASTENER REMOVER TOOL

FIELD OF THE INVENTION

The present invention relates generally to tools designed for tightening or loosening fasteners, in particular bolts and nuts. More specifically, the present invention is an anti-slip fastener remover tool that designed to engaged bolts, nuts, and other similar fasteners with little chance of slippage.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head portion that is connected at one end of the cylindrical shaft. The external thread engages a complimentary female thread tapped into a hole or a nut and secures the fastener in place, fastening the associated components together. The head portion receives an external torque force and is the means by which the fastener is turned, or driven, into the female threading. The head portion is shaped specifically to allow an external tool like a wrench to apply a torque to the fastener in order to rotate the fastener and engage the complimentary female threading to a certain degree. This type of fastener is simple, extremely effective, cheap, and highly popular in modern construction. One of the most common problems in using these types of fasteners, whether male or female, is the tool slipping in the head portion, or slipping on the head portion. This is generally caused by either a worn fastener or tool, corrosion, over-tightening, or damage to the head portion of the fastener. Various methods may be used to remove a fastener, some more aggressive than others. Once a fastener head is damaged, a more aggressive method must be implemented to remove a seized fastener. Drilling out the fastener is a common method used by some users to dislodge the fastener. While this method can prove to be effective in some scenarios there is a high risk of damaging the internal threads of the hole.

The present invention is an anti-slip fastener remover tool that virtually eliminates the chance of slippage. The present invention uses a series of integrated engagement segments that bite into the head portion of the fastener and allow for efficient torque transfer between the extractor bit and the head portion of the fastener. Resultantly, the present invention may be used to tighten or loosen fasteners without worrying about stripping the corners of the fastener.

DETAIL DESCRIPTIONS OF THE INVENTION

Figure 1:
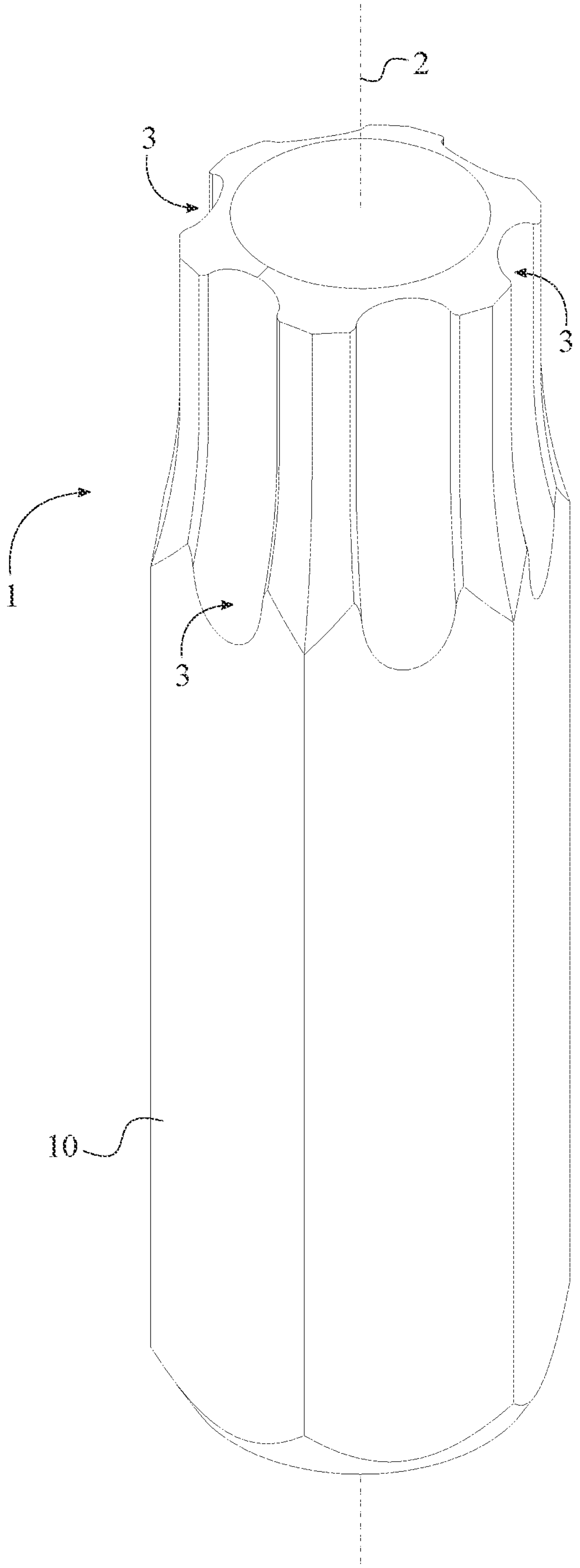
FIG. 1 is a perspective view of the present invention, wherein the torque-tool body is outwardly extended from the rotational axis to the plurality of paired engagement features.
Figure 2:
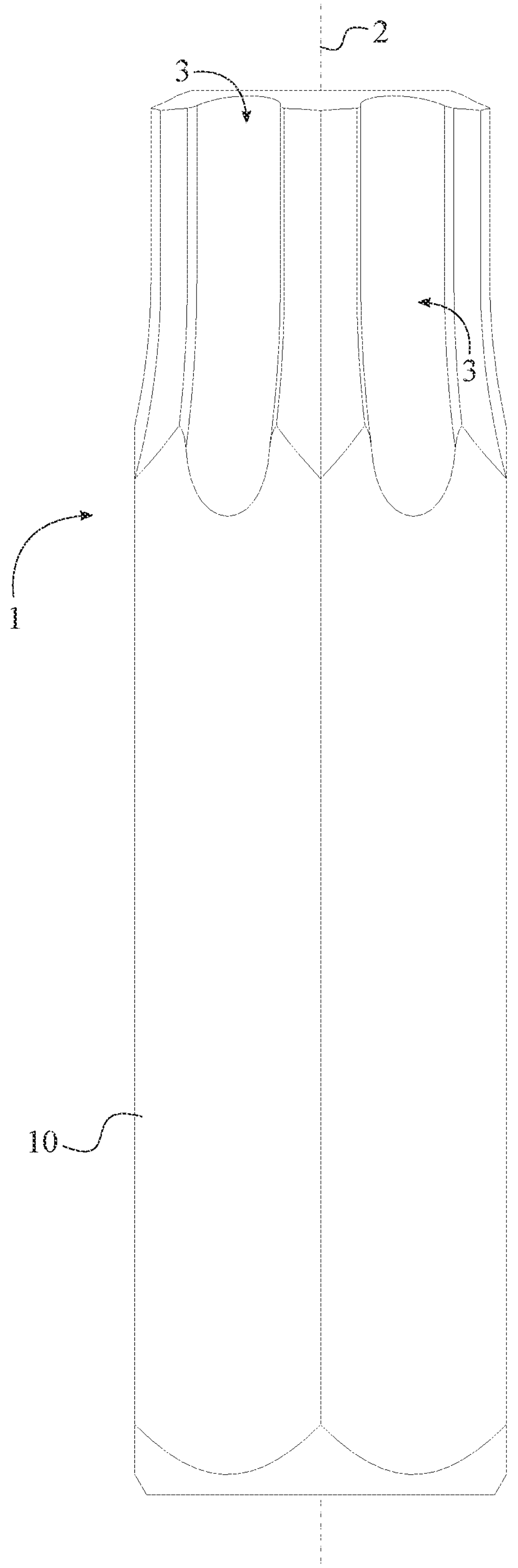
FIG. 2 is a side view of the present invention, wherein the torque-tool body is outwardly extended from the rotational axis to the plurality of paired engagement features.
Figure 3:
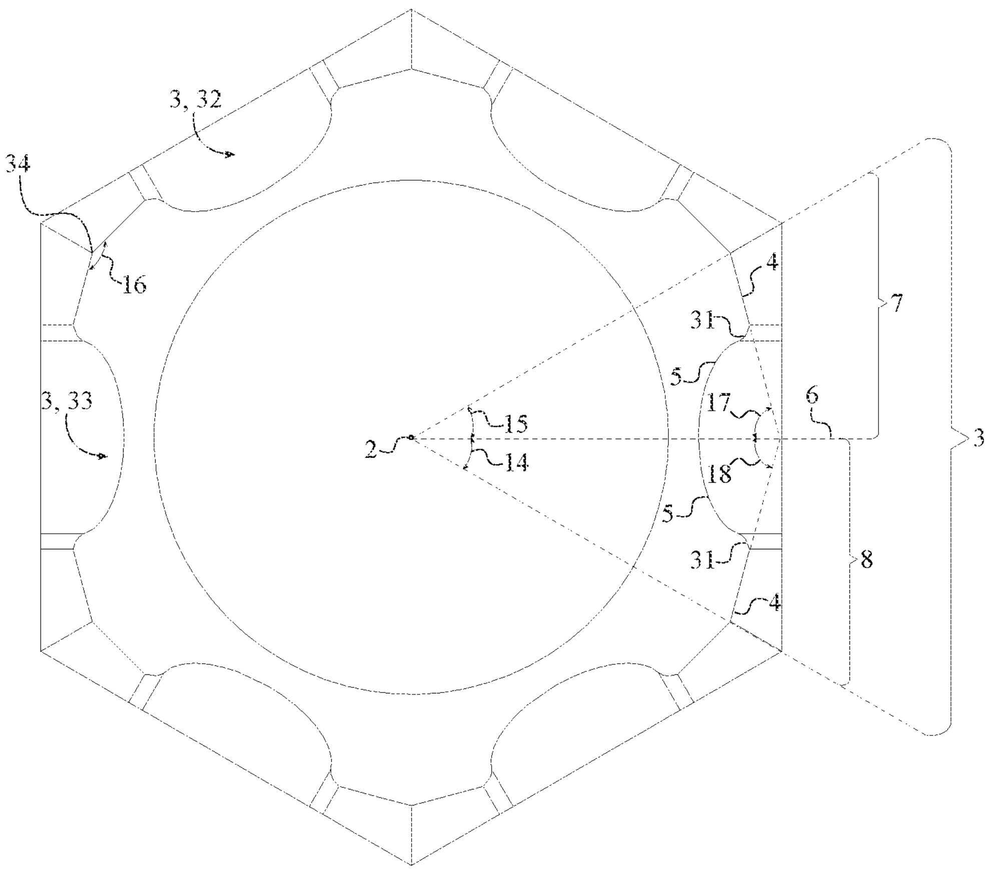
FIG. 3 is a top view of the present invention, wherein the torque-tool body is outwardly extended from the rotational axis to the plurality of paired engagement features.

All illustrations of the drawings are for the purpose of describing selected versions of the present invention and are not intended to limit the scope of the present invention.

The present invention is an anti-slip tool used to tighten or loosen a damaged/stripped fastener such as a nut or bolt. Traditional wrench designs transfer the majority of the torque to the damaged/stripped fastener through the lateral corners of the fastener head. Over time, the degradation of the lateral corners reduces the efficiency of transferring torque from the wrench to the fastener head and, as a result, causes slippage. The present invention overcomes this problem by moving the contact point to the lateral sides of the fastener head. This is accomplished through the use of a multitude of teeth. Each of the teeth is positioned to engage or "bite" the lateral surface of the fastener head instead of the lateral corner. This ensures an adequate amount of torque is transferred to the fastener head to initiate rotation and, resultantly, extraction or tighten the damaged/stripped fastener. However, the present invention is also designed to be used with an undamaged or new fastener without causing damage to the fastener when torque is applied in accordance with maximum specified and industry approved torque levels for the particular fastener size or diameter.

The present invention utilizes a multitude of teeth to engage the sides of the fastener head, damaged or otherwise, in order to efficiently apply torque onto the damaged/stripped fastener. The present invention may be integrated into or utilized by a variety of general tools to increase the torque force applied to a fastener. General tools include, but are not limited to, open-end wrenches, adjustable wrenches, pipe wrenches, socket wrenches, plumber wrench, and other similar fastener engaging tools. The present invention is compatible with female-member based head design fasteners; however, the present invention may be incorporated into a male fastener head design as described in this application. Fasteners which utilize a female-member head design, also known as female fasteners, use the internal cavity of the fastener head to engage a tool for tightening or loosening. Fasteners which utilize a male-member head design, also known as male fasteners, use the external lateral surface of the fastener head to engage a tool for tightening or loosening. In addition, the present invention is compatible with fasteners of a right-hand thread and fasteners of a left-hand thread. Furthermore, the present invention may be altered and configured to fit different types and different sizes of fasteners.

Referring to FIG. 1-15, the present invention comprises a torque-tool body 1, a plurality of paired engagement features 3, and a plurality of plurality of intersection points 34. The torque-tool body 1 is used as the physical structure to apply the corresponding force by the plurality of paired engagement features 3 on the fastener head. For some fasteners, the torque-tool body 1 functions similar to a driver-bit that is sized to fit into an opening of the fastener head in an interlocking manner. The length, width, and diameter of the torque-tool body 1 may vary to fit different sized male/female fasteners. The plurality of paired engagement features 3 prevents slippage of damaged/stripped fastener during extraction and is radially positioned around a rotational axis 2 of the torque-tool body 1 as seen in FIG. 3-6 and FIG. 8. In an alternative embodiment, the present invention may further comprise a plurality of intermittent sidewalls interspersed amongst the plurality of paired engagement features 3. As a result, the plurality of paired engagement features 3 facilitates the transfer of torque to the male/female fastener by preventing slippage between the torque-tool body 1 and the fastener head. The plurality of intersection points 34 is identified as the meeting points of two plurality of paired engagement features 3. In other words, an arbitrary paired engagement feature 32 from the plurality of paired engagement features 3 and an adjacent paired engagement feature 33 from the plurality of paired engagement features 3 are connected to each other through the plurality of intersection points 34. Depending upon different embodiments of the present invention, the plurality of intersection points 34 can be a sharp point or a curved section similar to a small radius. In some embodiments, the plurality of intersection points 34 may incorporate a third segment 45, wherein the third segment 45 is preferably a straight, flat portion connected between the plurality of paired engagement features 3 of the arbitrary bracing section 4 and an adjacent bracing section 4. More specifically, FIG. 1-6, the torque tool body 1 is a male embodiment designed for use in a female socket type fastener and FIG. 7-15, the torque tool body 1 is a female embodiment designed for use in a male type fastener.

The plurality of paired engagement features 3 is distributed into a polygon shape within the torque-tool body 1 and preferably symmetric along the rotational axis 2, wherein the rotational axis 2 centrally traverses through the torque-tool body 1. A symmetrical design is ensured within the present invention to perform equally when rotating the fastener in a clockwise direction or in a counterclockwise direction. In some embodiments, to increase or reduce grip in a clockwise or counterclockwise direction, the engagement features may be asymmetrical.

In reference to FIG. 1-6, the torque-tool body 1 is outwardly extended from the rotational axis 2 to the plurality of paired engagement features 3. This yields the driver-bit structure for the present invention as the plurality of paired engagement features 3 is distributed about the rotational axis 2 on an external surface of the torque-tool body 1. The driver-bit structure of the torque-tool body 1 associates with the opening of the fastener head so that the plurality of paired engagement features 3 can internally engage with the fastener head.

In reference to FIG. 7-15, the torque-tool body 1 is inwardly extended from an outer wall 20 of the torque-tool body 1 to the plurality of paired engagement features 3. This yields the female-socket structure for the present invention as the plurality of paired engagement features 3 is distributed about the rotational axis 2 on an internal surface of the torque-tool body 1. The female-socket structure of the torque-tool body 1 associates with the lateral surfaces of the fastener head so that the plurality of paired engagement features 3 can externally engage with the fastener head. More specifically, FIG. 8-9, the torque tool body 1 is a female embodiment designed for use on the male surface of a fastener.

The present invention also incorporates an attachment feature which allows an external torque applying tool to attach to the torque-tool body 1 and increase the torque force applied to the fastener head. In reference to FIGS. 1-2 and 6-7, the present invention further comprises an attachment body 10 and an engagement bore 11 that allow an external torque applying tool such as an open ended wrench, a box ended wrench, a combination wrench, an adjustable wrench, and a socket wrench or ratchet wrench to be attached to the torque-tool body 1. The attachment body 10 is centrally positioned around and along the rotational axis 2 in order to align with the axis of rotation of the external torque applying tool. Furthermore, the attachment body 10 is connected adjacent to the torque-tool body 1. The attachment body 10 diameter is preferably slightly larger than the diameter for the torque-tool body 1. However, the attachment body 10 may incorporate a smaller diameter than the torque-tool body 1 or, the attachment body 10 may incorporate a same size diameter as the torque-tool body 1 depending upon the preferred manufacturing method or design. The engagement bore 11 traverses into the attachment body 10 along the rotational axis 2. The engagement bore 11 is shaped to receive a male attachment member of a socket wrench, wherein the preferred shape of the engagement bore 11 is a square as the majority of socket wrenches utilize a square male attachment member. In alternative embodiments, the shape and design of the engagement bore 11 and the attachment body 10 may vary to be adaptable to different torque applying tools and different attachment means including, but not limited to, square or cylindrical. In an alternative embodiment, an outer surface of the attachment body 10 may have surface griping treatment applied such as knurling or other alternative methods to increase the friction between torque-tool body 1 and the user's hand.

A bottom surface of the attachment body 10 may be tapered away from the engagement bore 11 so that the plurality of paired engagement features 3 can be driven into the damaged/stripped fastener head by a hammer, without hitting or damaging the engagement bore 11. In other words, depending on the user's preference a diameter of the attachment body 10 about the engagement bore 11 may be slightly larger than a diameter of the attachment body 10 about the torque-tool body 1 so that the bottom surface of the attachment body 10 can be tapered away from the engagement bore 11. In some embodiments of the present invention, the attachment body 10 may not comprise the engagement bore 11 as the attachment body 10 itself functions as the engagement feature between the present invention and the external torque force. The attachment body 10 may be an external Hex or square able to have torque applied by an external torque tool such as wrench, socket, or pliers. An alternative attachment body 10 may incorporate a wrench handle wherein the wrench handle may preferably be diametrically connected to the torque tool body 1. In other words, the wrench handle would be connected perpendicular to the torque tool body 1 and the rotational axis 2.

Additionally, a wrench handle can be peripherally connected to the torque-tool body 1, wherein the wrench handle functions as the external torque applying tool. With respect to the female torque tool body 1, each of the plurality of paired engagement features 3 is extended along a specific length of the torque-tool body 1 thus delineating an empty space within the torque-tool body 1. The aforementioned empty space functions as a receptive cavity for the fastener head so that the plurality of paired engagement features 3 can grip the lateral surface of the fastener head. The present invention further comprises a fastener-receiving hole that traverses through the torque-tool body 1. The fastener-receiving hole, perpendicular to the rotational axis 2, is positioned opposite the wrench handle and across the torque-tool body 1 thus providing a lateral opening to engage the plurality of paired engagement features 3.

The attachment body 10 can also incorporate a quick connect feature that is typically used in drills, impact drivers, and screwdriver attachments.

The plurality of paired engagement features 3 is equally spaced about the torque-tool body 1 to create an enclosed profile as seen in FIGS. 3-5 and 10-15. In order to configure the enclosed profile, the plurality of paired engagement features 3 comprises a first engagement feature 7, a second engagement feature 8, and a bisecting line 6.

Referring to FIG. 1-15, a cross section for the first engagement feature 7 and the second engagement feature 8 each comprises a bracing section 4, a cavity section 5, a connector section 31 as shown in FIG. 3-5 and FIG. 10-15. More specifically, the bracing section 4 and the cavity section 5 are adjacently connected to each other by the connector section 31 thus delineating a single engagement feature that cuts into the fastener head during the removal of the damaged/stripped fastener. The connector section 31 is preferably a small convex, however the connector section 31 may be angular or concave in shape. The connector section 31 may further be a sharp intersecting point. It is preferred that the connector section 31 is shorter in length than the bracing section 4 or the cavity section 5 of the first engagement feature 7 and the second engagement feature 8; however, the connector section 31 may be any length ratio with the other components within the first engagement feature 7 and the second engagement feature 8. In some embodiments, the bracing surface 4, the connector section 31, and the first portion of the cavity section 5 are contiguous and colinear. Further, for embodiments in which the bracing section 4 and the connector section 31 are concave, the radius of the bracing section 4 and the connector section 31 may match and follow the curve of the cavity section 5, creating a smooth curve along the bracing section 4, connector section 31, and cavity section 5. Within the aforementioned single male engagement feature, the bracing section 4 functions as the third engagement feature, the cavity section 5 functions as the first engagement feature, and the connector section 31 functions as the second engagement feature. However, it is understood that in a female embodiment of the present invention the order of the paired engagement features 3 is reversed. Additionally, the order of the paired engagement features 3 is not limited to the aforementioned order as in certain embodiments or applications or fasteners the order may be any sequence. For example, in certain situations the order of the paired engagement features 3, the connector section 31 may be the first engagement feature. When torque force is applied to the torque-tool body 1, the fastener head may engage with the first engagement feature, the second engagement feature, or the third engagement feature of the single engagement feature or by all three engagement features within the single engagement feature depending on the profile of the fastener head.

In some torque-tool body 1 applications or embodiments, when the bracing section 4 engages with a male fastener, as shown in FIG. 6-15, the cavity section 5 remains an empty space. In other words, the bracing section 4 of the plurality of paired engagement features 3 engages with the fastener, however the cavity section 5 does not engage with the fastener head but rather becomes a void, thus allowing greater force to be applied to the fastener surface by way on the bracing section 4 of the plurality of paired engagement features 3. Even though the bracing section 4 from the arbitrary paired engagement feature 32 and the bracing section 4 of the adjacent paired engagement feature 33 both may engage simultaneously with a fastener surface, the torque force of the first engagement feature 7 and the second engagement feature 8 alternate within the enclosed profile to become intermittent depending on the rotation direction of the tool. In other words, when the first engagement features 7 engage with the fastener and torque force is applied, the second engagement features 8 become intermittent. Alternatively, when the second engagement features 8 engage with the fastener and torque force is applied, the first engagement features 7 become intermittent. The bisecting line 6 separates the first engagement feature 7 and the second engagement feature 8 into equal sections within each of the plurality of paired engagement features 3.

A top surface of the torque-tool body 1 and the bottom surface of the attachment body 10 are positioned opposite of each other across the plurality of paired engagement features 3, wherein the top surface and the bottom surface are configured as flat surfaces.

The length of the bracing section 4 and the cavity section 5 and the corresponding angles between the bracing section 4 and the cavity section 5 may vary to create a sharper tooth-like shape for the engagement feature. The first engagement feature 7 is any feature within the plurality of paired engagement features 3 in such a way that the second engagement feature 8 is the feature directly next to the first engagement feature 7 within corresponding the plurality of paired engagement features 3. More specifically, the cavity section 5 of the first engagement feature 7 is adjacently connected to the cavity section 5 of the second engagement feature 8. As shown in FIG. 1-6 the cavity section 5 of the first engagement feature 7 and the cavity section 5 of the second engagement feature 8 are oriented towards the rotational axis 2 thus collectively delineating a radial profile, preferably a partially circular shape or an oval shape, but may also be an angular profiled shape such as triangular, trapezoidal, square but not limited to these shapes. The cavity section 5 may also be a combination of shapes joined together If preferred for manufacturing purposes the shapes or components may be joined by a radial profile. The bracing section 4 of the first engagement feature 7 and the bracing section 4 of the second engagement feature 8 are oppositely positioned of each other about the cavity section 5 of the first engagement feature 7 and the cavity section 5 of the second engagement feature 8 and are oriented away from the rotational axis 2. In other words, the cavity section 5 of the first engagement feature 7 and the cavity section 5 of the second engagement feature 8 are adjacently positioned in between the bracing section 4 of the first engagement feature 7 and the bracing section 4 of the second engagement feature 8.

In reference to FIG. 1-15, a first length ratio between the bracing section 4 of the first engagement feature 7 and the cavity section 5 of the first engagement feature 7 is 1:2. The bracing section 4 of the first engagement feature 7 is preferably a flat surface; however, the bracing section 4 of the first engagement feature 7 may also be a camber surface or a concave surface. A second length ratio between the bracing section 4 of the second engagement feature 8 and the cavity section 5 of the second engagement feature 8 is 1:2. The bracing section 4 of the second engagement feature 8 is preferably a flat surface; however, the bracing section 4 of the second engagement feature 8 may also be a camber surface or a concave surface.

In reference to FIGS. 3-4 and 10-15, the connector section 31 is delineated as the meeting point of the cavity section 5 and the bracing section 4 of the first engagement feature 7 and as the meeting point of the cavity section 5 and the bracing section 4 of the second engagement feature 8. Depending upon different embodiments of the present invention, the connector section 31 may be a sharp point or a smooth point (curved section) as preferred by the user. Furthermore, the connector section 31 is preferably a convex segment and oriented away from the rotational axis 2. However, the connector section 31 can also be a flat segment, a concave segment, or may connect with the bracing section 4 at an obtuse angle. The connector section 31 is a novel improvement to the interchange between the flat bracing section 4 and the cavity section 5, wherein the connector section 31 gives the user an additional engagement surface. The additional engagement surface delineated as the connector section 31 provides the user the option to alter the tool to a sharp connector section 31 for greater grip. Alternatively, a radial flat or concave surface gives the user greater surface contact when torque is applied.

Figure 4:
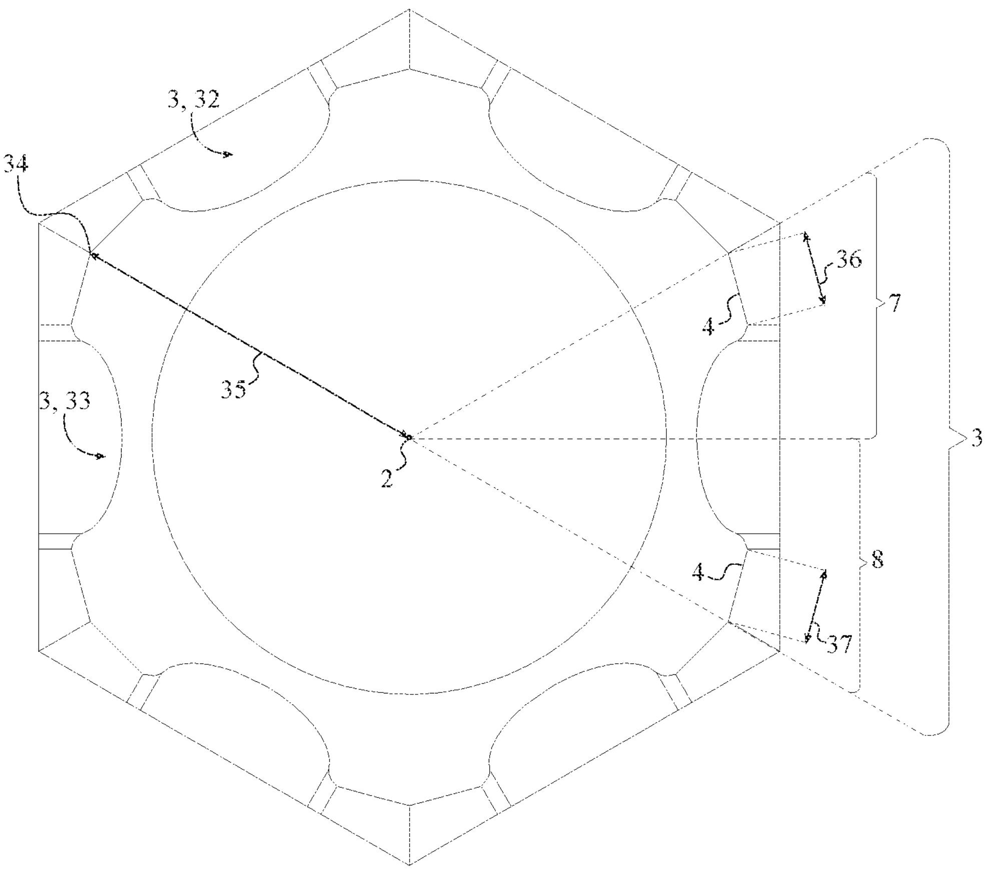
FIG. 4 is a top view of the present invention, wherein the torque-tool body is outwardly extended from the rotational axis to the plurality of paired engagement features.
Figure 11:
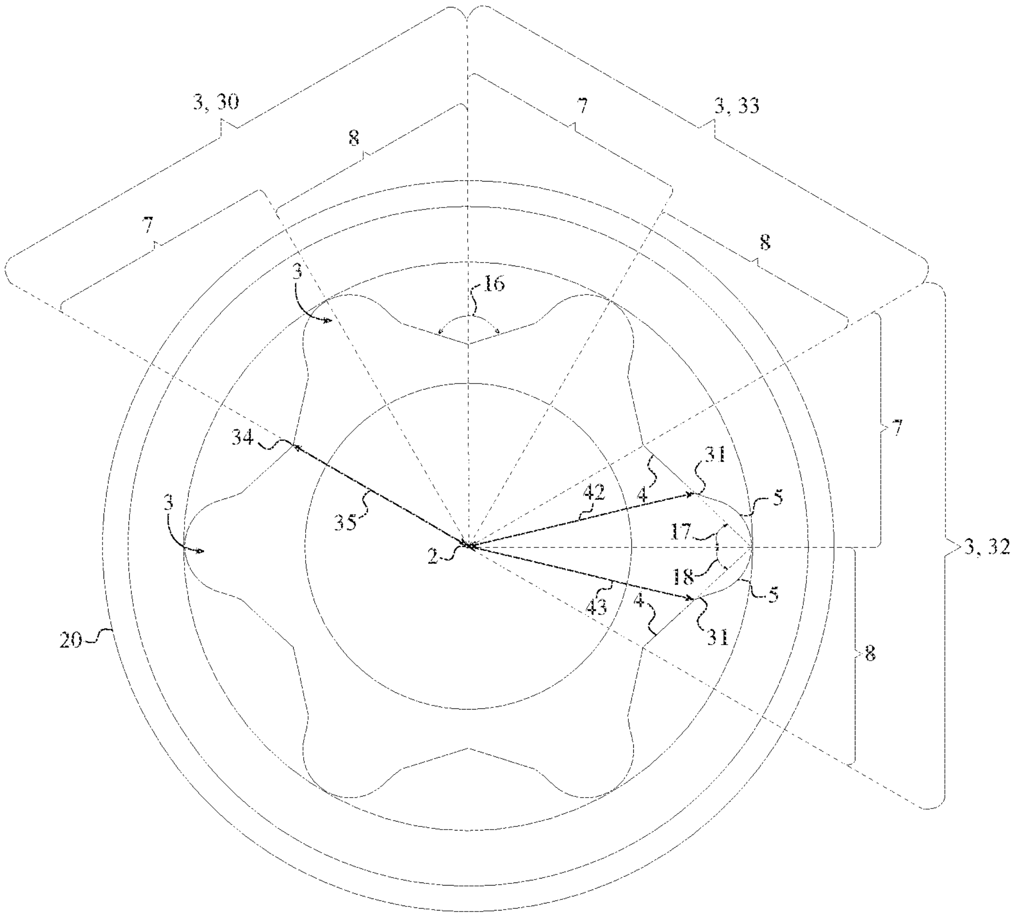
FIG. 11 is a top view of the present invention, wherein the torque-tool body is inwardly extended from an outer wall of the torque-tool body to the plurality of paired engagement features.

Furthermore, a first bisecting angle 17 of the present invention is delineated between the connector section 31 of the first engagement feature 7 and the bisecting line 6 as shown in FIGS. 4 and 11. Depending upon different embodiment of the present invention, the first bisecting angle 17 can be an acute angle, a right angle, and an obtuse angle.

Furthermore, a second bisecting angle 18 of the present invention is delineated between the connector section 31 of the second engagement feature 8 and the bisecting line 6 as shown in FIGS. 4 and 11. Depending upon different embodiment of the present invention, the second bisecting angle 18 can be an acute angle, a right angle, and an obtuse angle.

Due to the angular positioning of the first bisecting angle 17 and the second bisecting angle 18, when an imaginary straight line is drawn in between the connector section 31 of the first engagement feature 7 and the connector section 31 of the second engagement feature 8, the imaginary straight line is positioned perpendicular to the bisecting line 6.

Furthermore, the first bisecting angle 17 and the second bisecting angle 18 are collectively combined into an angle less than 180 degrees when a first extended line is drawn parallel to the bracing section 4 of the first engagement feature 7 and intersected through the connector section 31 of the first engagement feature 7, and a second extended line is drawn parallel to the bracing section 4 of the second engagement feature 8 and intersected through the connector section 31 of the first engagement feature 7.

Furthermore, the bracing section 4 of the first engagement feature 7 and the bracing section 4 of the second engagement feature 8 are positioned offset of each other. More specifically, the present invention further comprises a first geometric plane and a second geometric plane. The first geometric plane is positioned parallel to the bracing section 4 of the first engagement feature 7, and the second geometric plane that is positioned parallel to the bracing section 4 of the second engagement feature 8 as the first geometric plane and the second geometric plane are positioned offset of each other. In other words, the first geometric plane and the second geometric plane are not co-planer within the present invention. More specifically, the bracing section 4 of the first engagement feature 7 and the bracing section 4 of the second engagement feature 8 are not aligned with each other. Additionally, a geometric plane of the bracing section 4 is preferably not aligned with the plane of a fastener bracing surface for female versions and the male version of the present invention. Whereas it is preferred that the bracing section 4 of the first engagement feature 7 and the bracing section 4 of the second engagement feature 8 are not aligned with one another, for some fastener profiles, the cross section of the torque-tool body 1 may include the bracing section 4 of the first engagement feature 7 and the bracing section 4 of the second engagement feature 8 aligned with one another.

Figure 5:
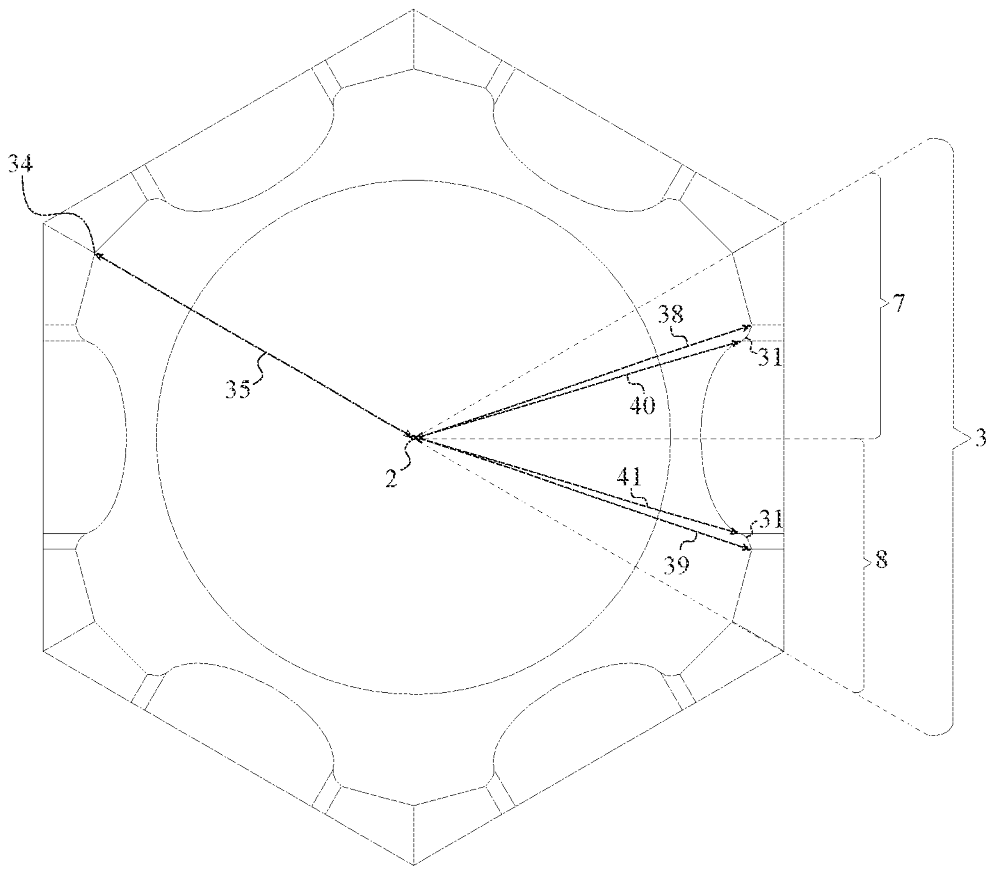
FIG. 5 is a top view of the present invention, wherein the torque-tool body is outwardly extended from the rotational axis to the plurality of paired engagement features.
Figure 6:
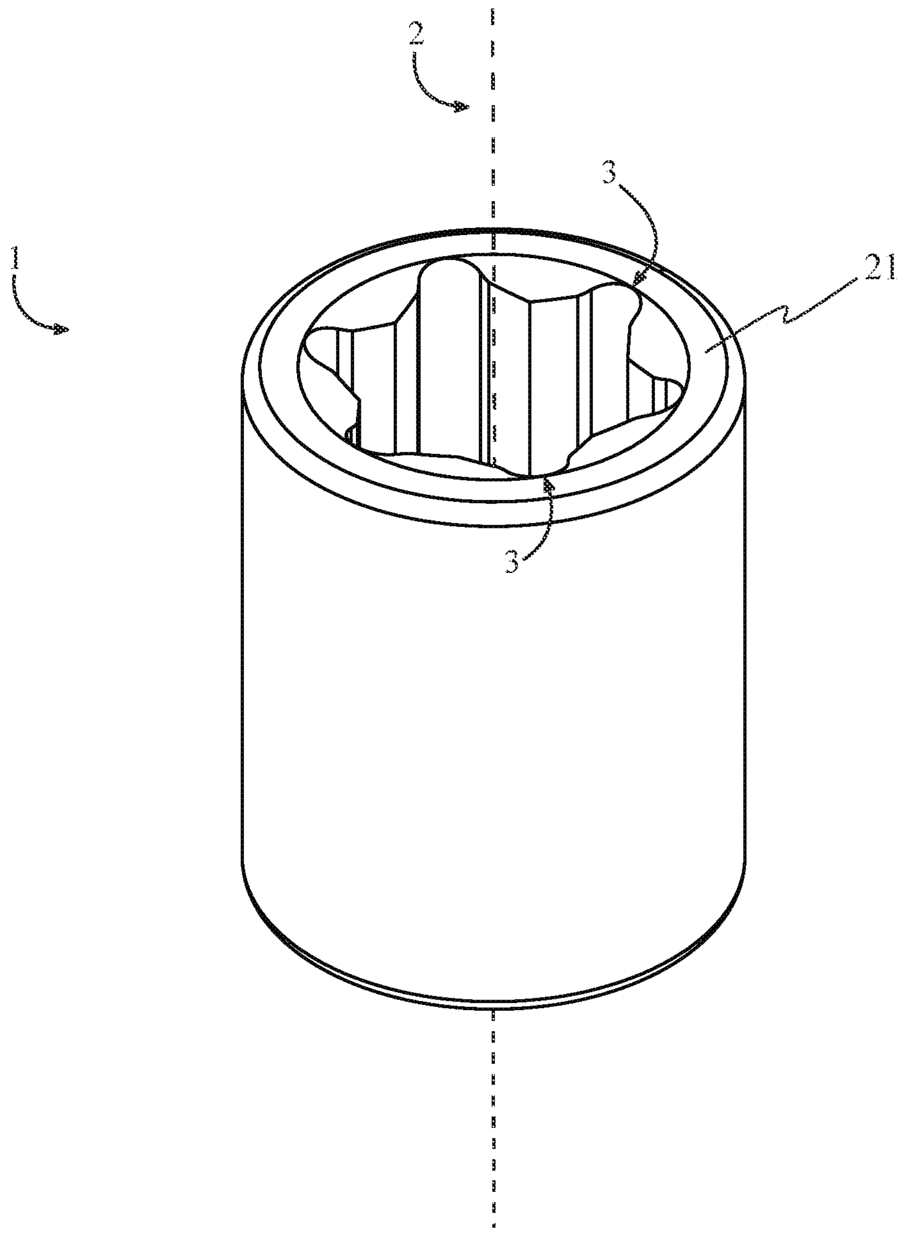
FIG. 6 is a perspective view of the present invention, wherein the torque-tool body is inwardly extended from an outer wall of the torque-tool body to the plurality of paired engagement features.
Figure 7:
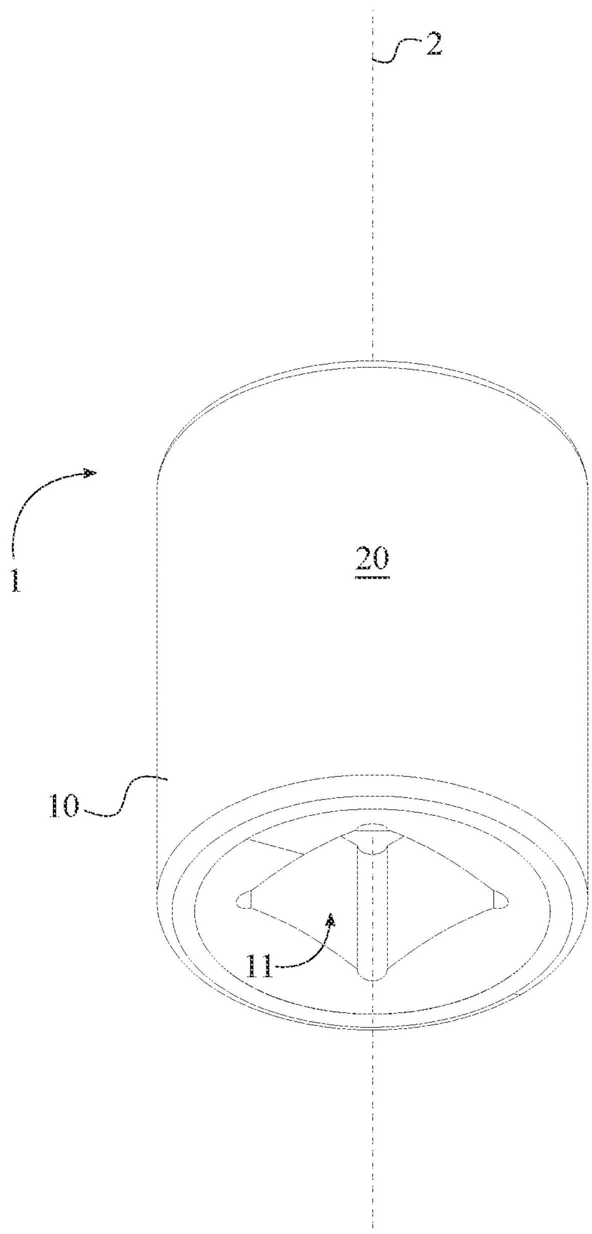
FIG. 7 is a bottom perspective view of the present invention, wherein the torque-tool body is inwardly extended from an outer wall of the torque-tool body to the plurality of paired engagement features, showing the engagement bore.
Figure 8:
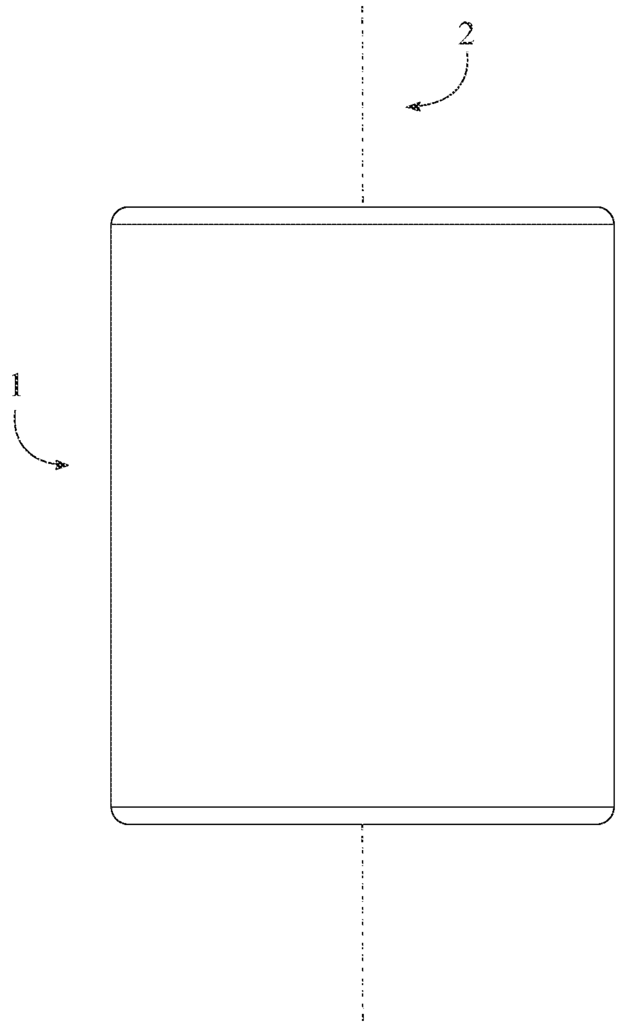
FIG. 8 is a side view of the present invention, wherein the torque-tool body is inwardly extended from an outer wall of the torque-tool body to the plurality of paired engagement features.

Furthermore, a radial distance 35 of the plurality of intersection points 34 is 4 to 12 times larger than a first length 36 for the bracing section 4 of the first engagement feature 7 or a second length 37 for the bracing section 4 of the second engagement feature 8 as shown in FIG. 6. The first length 36 is the length of the bracing section 4 of the first engagement feature 7 for any cross section of the torque-tool body 1 parallel to the first base 21 and the second base 22 while the second length 37 is the length of the bracing section 4 of the first engagement feature 8 for any cross section of the torque-tool body 1 parallel to the first base 21 and the second base 22. Furthermore, the radial distance 35 of the plurality of intersection points 34 is larger than a radial distance 38 for the connector section 31 connected to the bracing surface 4 of the first engagement feature 7 and a radial distance 39 for the connector section 31 of the second engagement feature 8 as shown in FIG. 5. Additionally, the radial distance 38 is greater than a radial distance 40 for the connector section 31 connected to the cavity section 5 of the first engagement feature 7 and a radial distance 39 is greater than a radial distance 41 the connector section 31 connected to cavity section 5 of the second engagement feature 8 as shown in FIG. 5.

Figure 12:
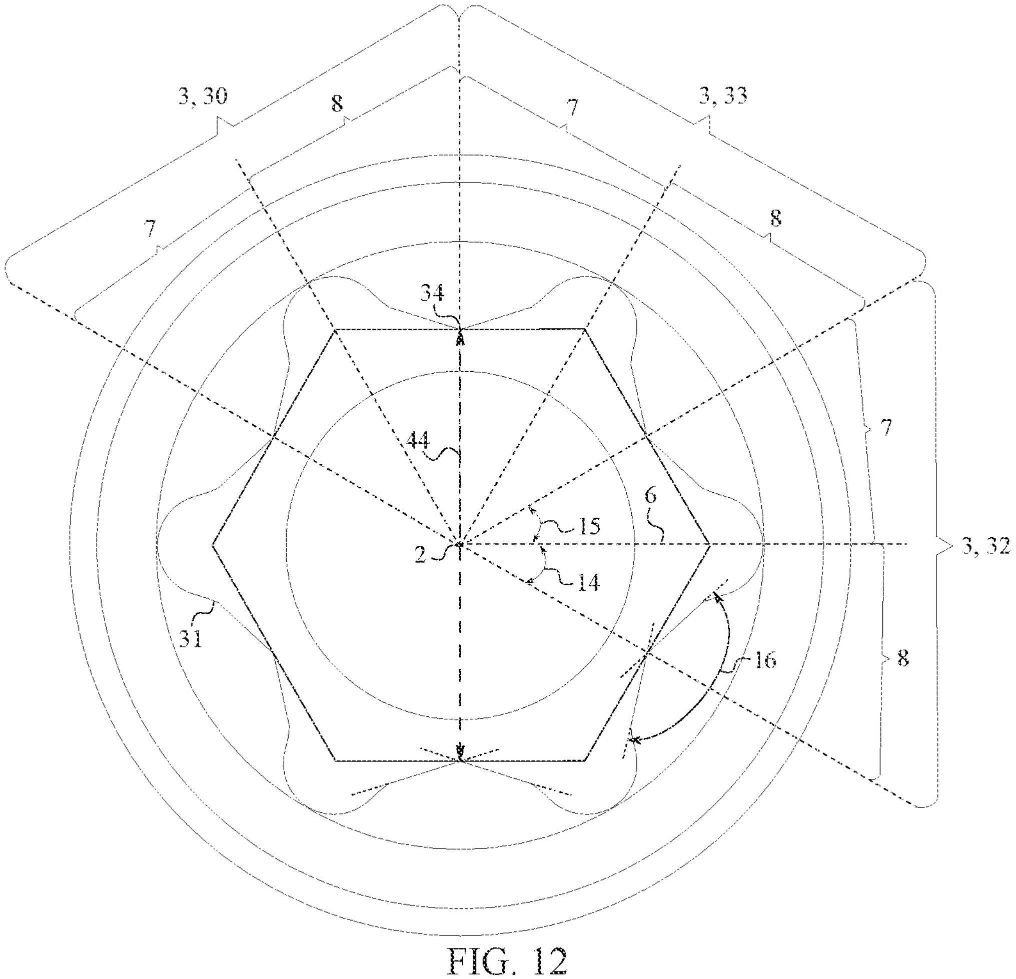
FIG. 12 is a top view of the present invention engaged with a bolt, wherein the torque-tool body is inwardly extended from an outer wall of the torque-tool body to the plurality of paired engagement features.

In reference to FIG. 3-5 and FIG. 10-15, preferably, the number of the plurality of paired engagement features 3 in contact with the fastener head is six as the six paired engagement features 3 is equal to 12 single engagement features. A first angle 14 between the first engagement feature 7 is 30 degrees and a second angle 15 between the second engagement feature 8 is 30 degrees. Furthermore, in reference to FIGS. 3 and 11, a third angle 16 between each of the plurality of paired engagement features 3 is less than 180 degrees. Specifically, the third angle 16 is the angle between the bracing section 4 of the first engagement feature 7 of one of the plurality of paired engagement features 3 and the bracing section 4 of the second engagement feature 8 of one of the plurality of paired engagement features 3 at one of the plurality of intersection points 34. As a result, an angular orientation between each of the plurality of paired engagement features 3 can be changed according to different embodiments of the present invention. In the preferred embodiment, the third angle is less than 160 degrees. More specifically, some embodiment of the present invention, the third angle 16 can be 130 degrees. Some embodiments of the present invention, the third angle 16 can be 135 degrees. Some embodiments of the present invention, the third angle 16 can be 140 degrees Some embodiments of the present invention, the third angle 16 can be 145 degrees. Some embodiments of the present invention, the third angle 16 can be 150 degrees. In certain alternative embodiments, the third angle 16 may be an acute angle less than 90 degrees. The sharp third angle 16 and the point-to-point engagement 44 enhances the plurality of intersection points 34 biting and gripping into a fastener lateral surface during use. Additionally, this orientation allows the present invention to engage and drive fasteners via the plurality of intersection points 34 rather than using a flat portion such as the bracing section 4 for side surface engagement with a fastener. Further, the point-to-point engagement 44 with a fastener lateral surface employed by the plurality of intersection points 34 being oppositely positioned about the rotational axis 2 enables the present invention to engage fasteners on or about the center of the fastener flank. This point-to-point engagement 44 provides for superior grip and fastener retention that is offset further from fastener edges or corners than the side surface engagement used by the prior art of earlier tools, thus the point-to-point engagement 44 of the present invention provides the benefit of greatly reducing fastener slippage or damage. As shown in FIG. 12, additional benefits of the point-to-point engagement 44 include greater fastener corner distance or space from socket wall, further preventing fastener corner damage or slippage benefiting the user over previous designs.

Figure 9:
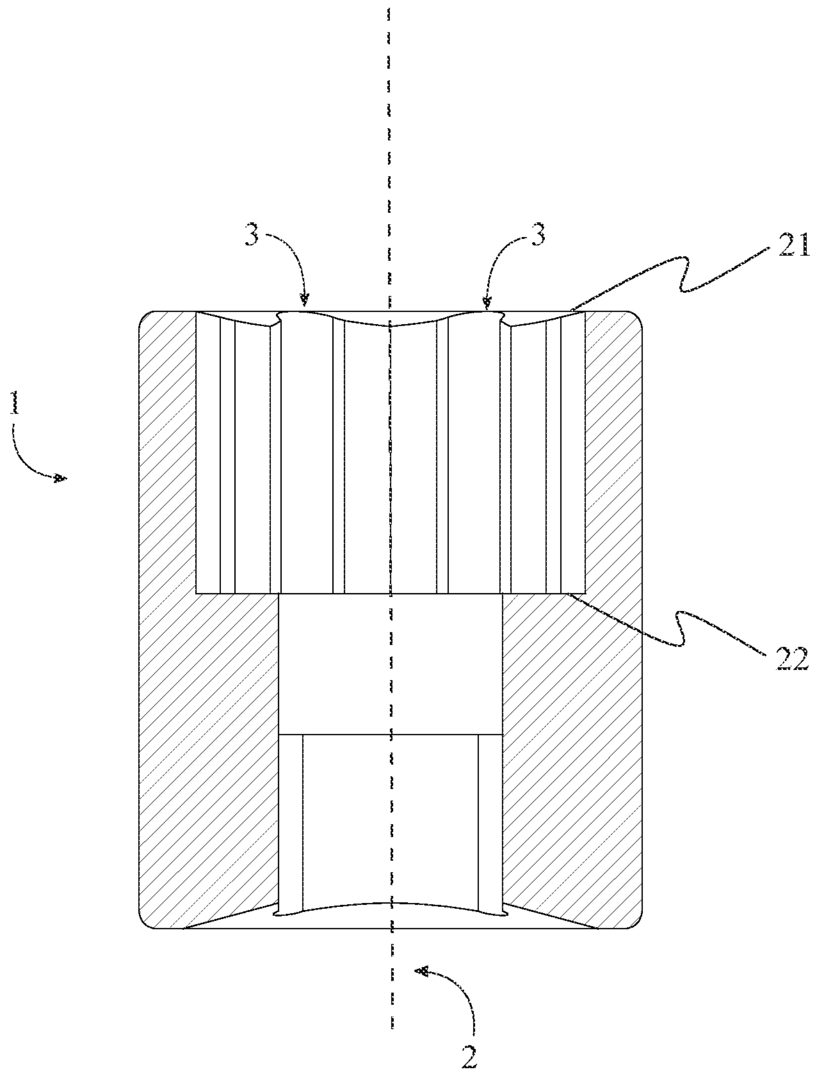
FIG. 9 is a side section view of the present invention, wherein the torque-tool body is inwardly extended from an outer wall of the torque-tool body to the plurality of paired engagement features.

In some embodiments of the present invention, the plurality of paired engagement features 3 can be tapered away from the rotational axis 2. In other words, an outer diameter of the plurality of paired engagement features 3 about the top surface of the torque-tool body 1 is smaller than an outer diameter of the plurality of paired engagement features 3 about the attachment body 10. In the case of the female embodiment of the present invention, a first base 21 is the plane at the opening of the torque-tool body 1 and a second base 22 is the plane opposite the first plane 21 about the plurality of paired engagement features. In this arrangement, as best seen in FIG. 9, each of the plurality of paired engagement features 3 is equal in length when measured along a distance parallel with the rotational axis 2 from the first base 21 to the second base 22. The inner diameter of the plurality of paired engagement features 3 at a first base 21 may be greater than the inner diameter of the plurality of paired engagement feature 3 at the second base 22, making the plurality of paired engagement features 3 tapered along the rotational axis 2 from the first base 21 to the second base 22. Additionally, the cavity section 5 of the first engagement feature 7 and the cavity section 5 of the second engagement feature 8 become narrower and shallower from the top surface of the torque-tool body 1 to the attachment body 10. Even though the cavity section 5 of the first engagement feature 7 and the cavity section 5 of the second engagement feature 8 collectively delineate a circular shaped profile, the present invention is not limited to the circular shaped profile and can be other type of geometric shapes. For example, the cavity section 5 of the first engagement feature 7 and the cavity section 5 of the second engagement feature 8 can delineate a triangular shaped profile within the corresponding bracing sections 4.

To remove the damaged/stripped fastener with the present invention, the torque-tool body 1 is positioned around the damaged/stripped fastener so that a significant portion of the plurality of paired engagement features 3 is positioned around or within the fastener head. The user then simply applies torque force to the torque-tool body 1 in order to rotate and remove the damaged/stripped fastener. When a torque force is applied to the torque-tool body 1, the plurality of paired engagement features 3 "bite" into the lateral sides of fastener head which in turn rotates the damaged/stripped fastener. The present invention is designed to engage partially or fully compromised fastener heads. The present invention overcomes slippage of the fastener head through the use of the plurality of paired engagement features 3.

The present invention is able to drive a fastener on cavity section 5 of the first engagement feature 7 and the cavity section 5 of the second engagement feature 8 in a corresponding lobular fastener design such as Torx, or E Torx as well as drive a fastener on the outer bracing surface of a socket fastener through the bracing sections 4 of the first engagement feature 7 and bracing sections 4 of the second engagement feature 8.

It is understood that all the components of the present invention can be mirror reversed to create male/female versions of the present embodiments. In other words, the female versions of the present invention would incorporate all the features, function and elements of the present invention but would be a female embodiment and the male versions would incorporate all the features, function, and elements of the associated female embodiments. The engagement features in the female embodiment would engage a male fastener lateral surfaces or sidewall. Whereas the protuberance on male version driver tool is orientated away from the rotational axis 2, the protuberance on the female driver tool is orientated towards the rational axis 2. Specifically, in a male embodiment, the bracing section 4 and the connector section 31 in the FIG. 1-6 are oriented away from the rotational axis 2 whereas in FIG. 7-15 the female embodiment, the bracing section 4 and the connector section 31 are oriented towards the rotational axis 2.

In the present invention, the length of the bracing section 4 and the cavity section 5 and the corresponding angles between the bracing section 4 and the cavity section 5 may vary to create a sharper tooth-like shape for the plurality of paired engagement features 3. Specifically, the bracing section 4 of the first engagement feature 7 may be greater in length then a length of the bracing section 4 of the second engagement feature 8, or the bracing section 4 of the second engagement feature 8 may be greater in length than a length of the bracing section 4 of first engagement feature 7 to create a sharp aggressive engagement, or less aggressive dull engagement as preferred by the user. The first engagement feature 7 is any feature within the plurality of paired engagement features 3 in such a way that the second engagement feature 8 is the feature directly next to the first engagement feature 7 within corresponding the plurality of paired engagement features 3. More specifically, the cavity section 5 of the first engagement feature 7 is adjacently connected to the cavity section 5 of the second engagement feature 8. As shown in FIG. 7-15, the plurality of intersection points 34 is identified as the meeting points of two of the plurality of paired engagement features 3. In other words, an arbitrary paired engagement feature 32 from the plurality of paired engagement features 3 and an adjacent paired engagement feature 33 from the plurality of paired engagement features 3 are connected to each other through the plurality of intersection points 34. The plurality of paired engagement features 3 may further comprise a distant paired engagement feature 30 wherein the adjacent paired engagement feature 33 is connected to the distant paired engagement feature 30 by one of the plurality of intersection points 34. Specifically, the bracing section 4 of the first engagement feature 7 of the arbitrary paired engagement feature 32 is connected to the bracing section 4 of the second engagement feature 8 of the adjacent paired engagement feature 33 by one of the plurality of intersection points 34 and the bracing section 4 of the first engagement feature 7 of the adjacent paired engagement feature 33 is connected to the bracing section 4 of the second engagement feature 8 of the distant paired engagement feature 30 by one of the plurality of intersection points 34. Further, in some embodiments, the bracing section 4 of first engagement feature 7 of the arbitrary paired engagement feature 32 is angularly offset from the bracing section 4 of the second engagement feature 8 of the distant paired engagement feature 30, while in other embodiments, these features are parallel to one another or colinear.

Figure 10:
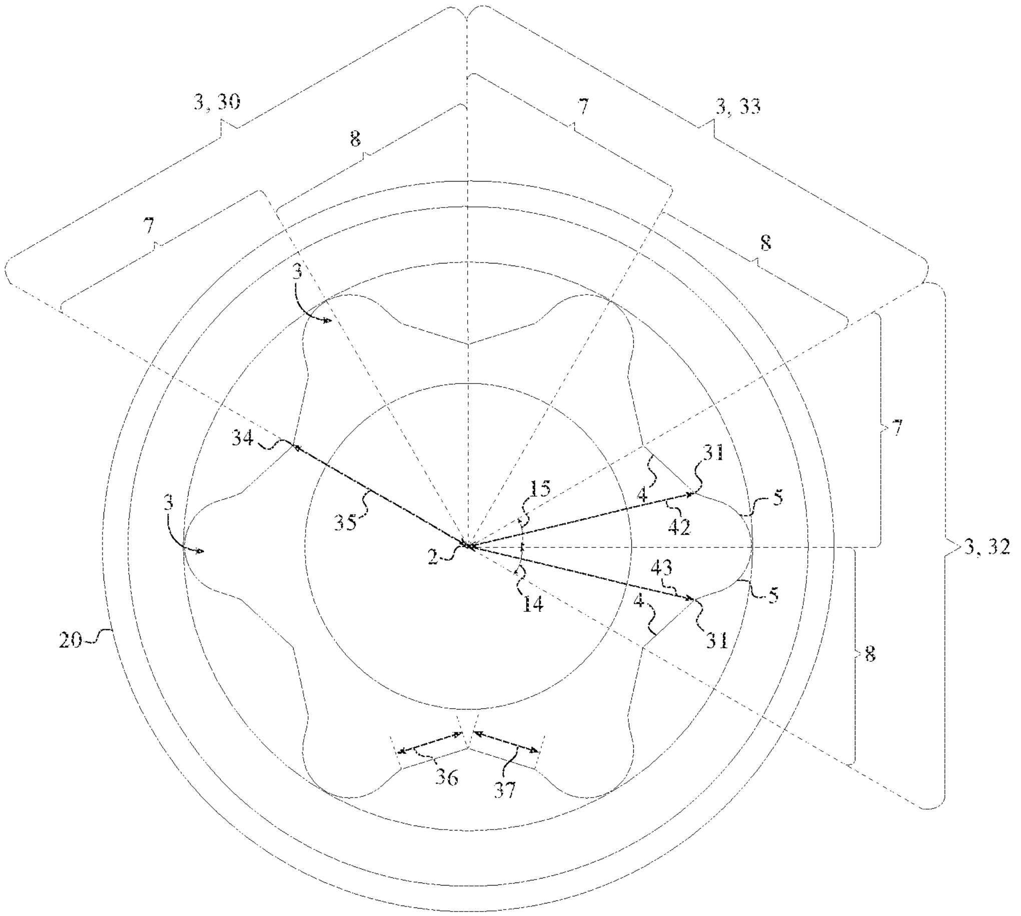
FIG. 10 is a top view of the present invention, wherein the torque-tool body is inwardly extended from an outer wall of the torque-tool body to the plurality of paired engagement features.
Figure 13:
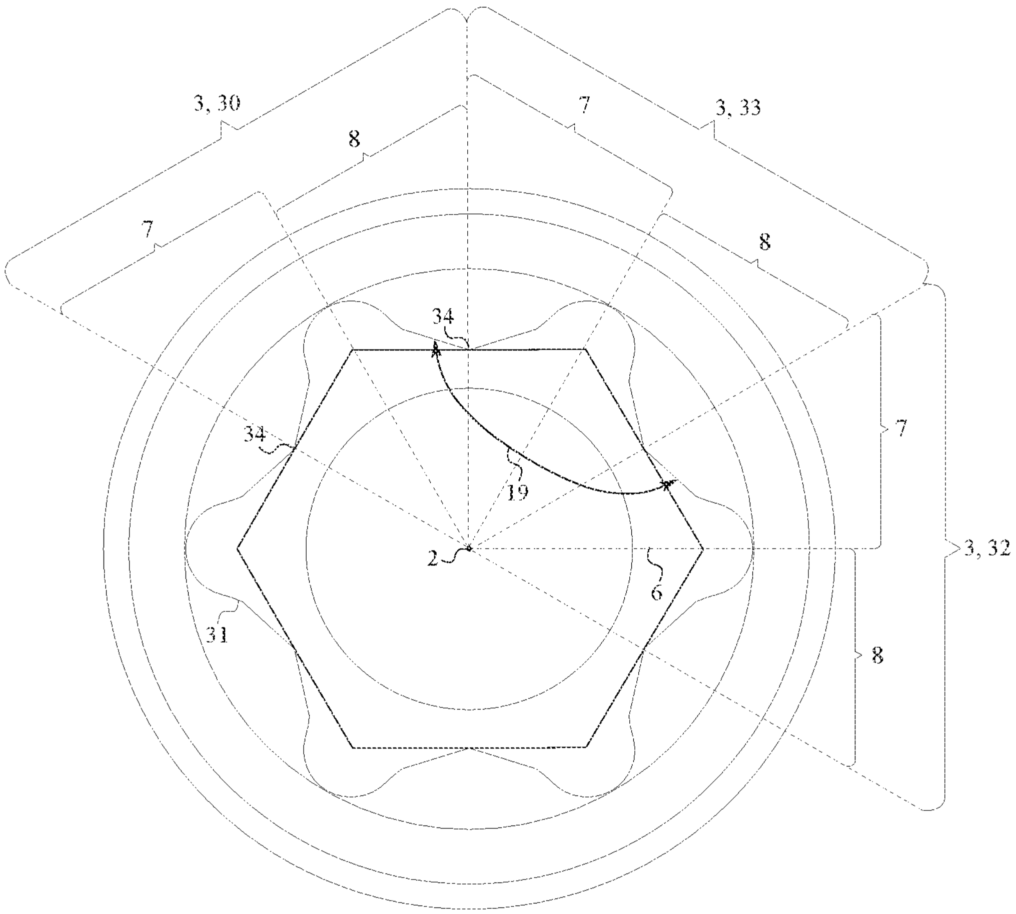
FIG. 13 is a top view of the present invention engaged with a bolt, wherein the torque-tool body is inwardly extended from an outer wall of the torque-tool body to the plurality of paired engagement features.
Figure 14:
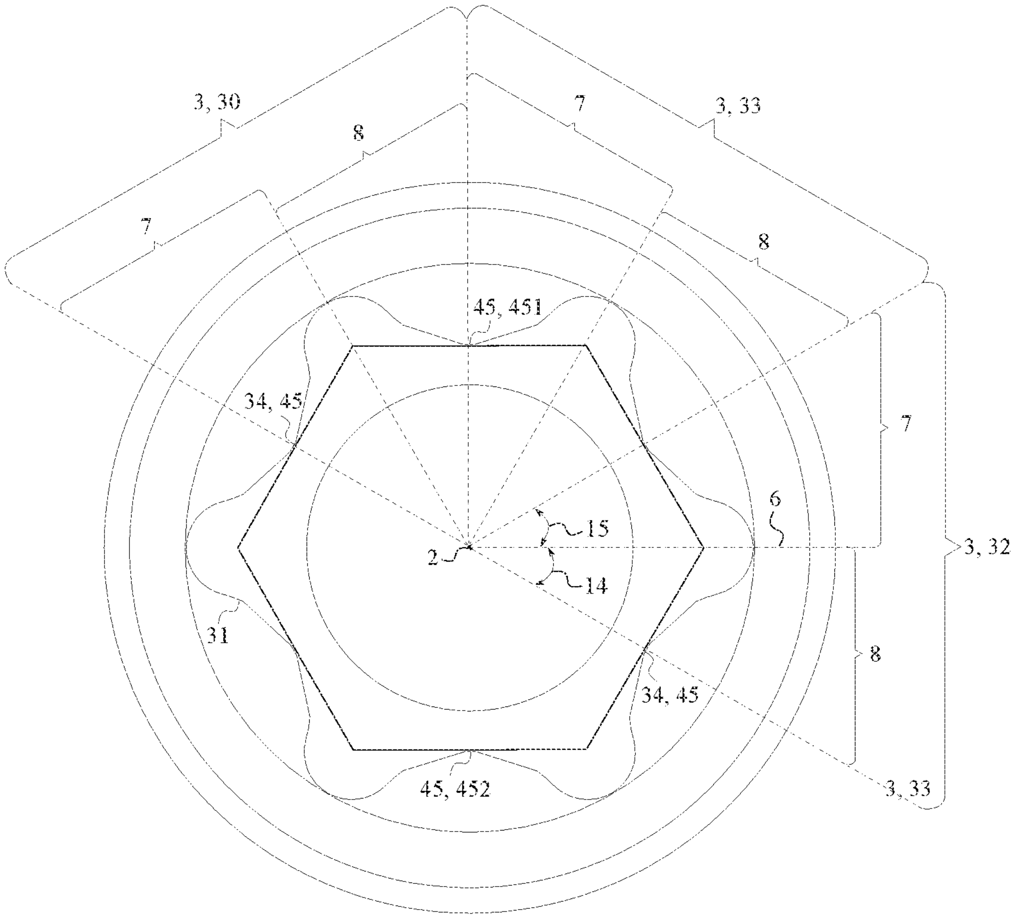
FIG. 14 is a top view of the present invention engaged with a bolt, wherein the torque-tool body is inwardly extended from an outer wall of the torque-tool body to the plurality of paired engagement features.
Figure 15:
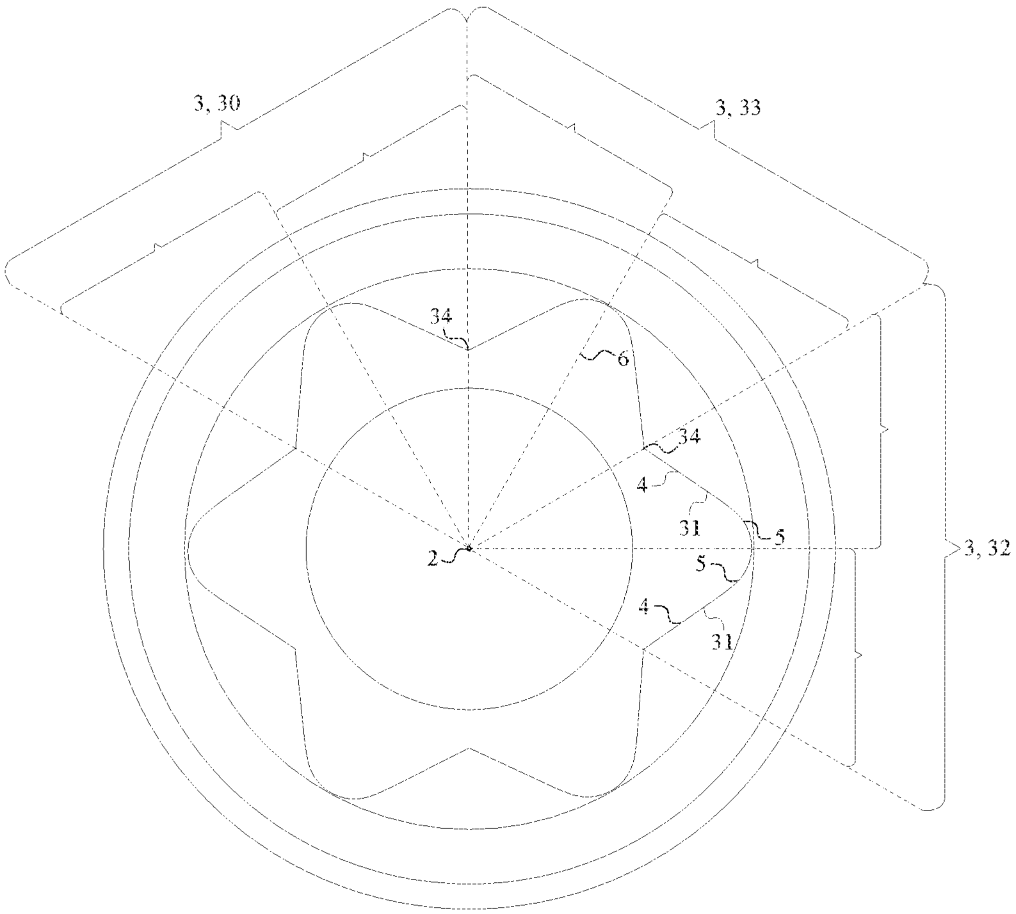
FIG. 15 is a top view of the present invention, wherein the torque-tool body is inwardly extended from an outer wall of the torque-tool body to the plurality of paired engagement features.
Figure 16:
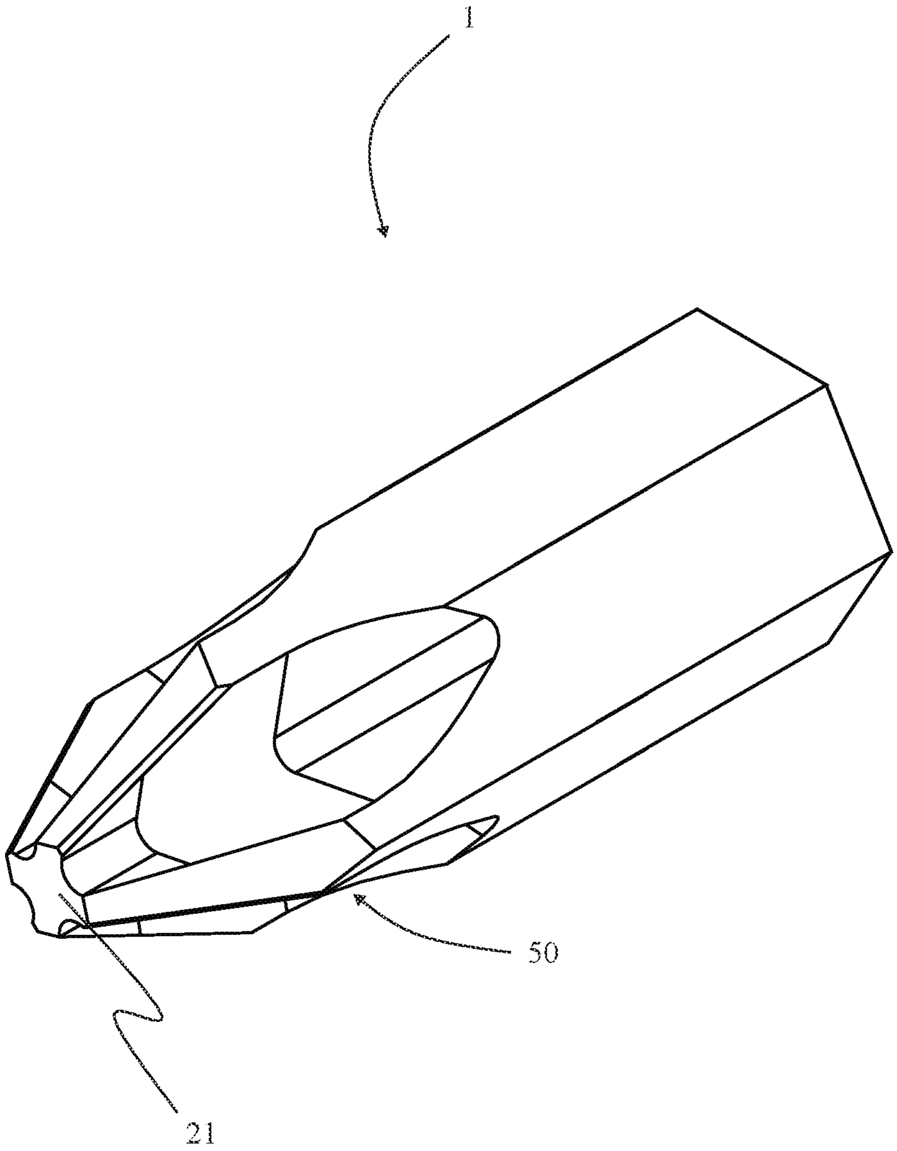
FIG. 16 is a perspective view of an alternative embodiment of the present invention, wherein the torque-tool body is outwardly extended from the rotational axis to the plurality of paired engagement features.
Figure 17:
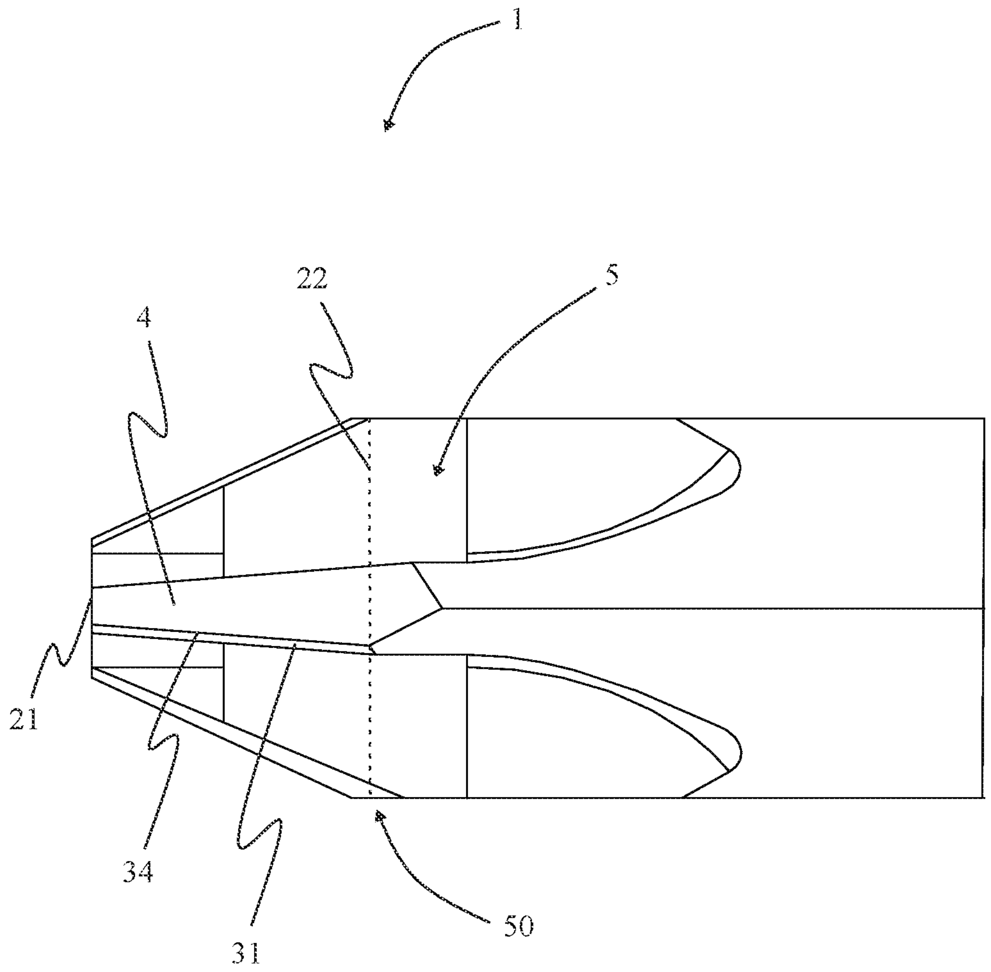
FIG. 17 is a side view of an alternative embodiment of the present invention, wherein the torque-tool body is outwardly extended from the rotational axis to the plurality of paired engagement features.
Figure 18:
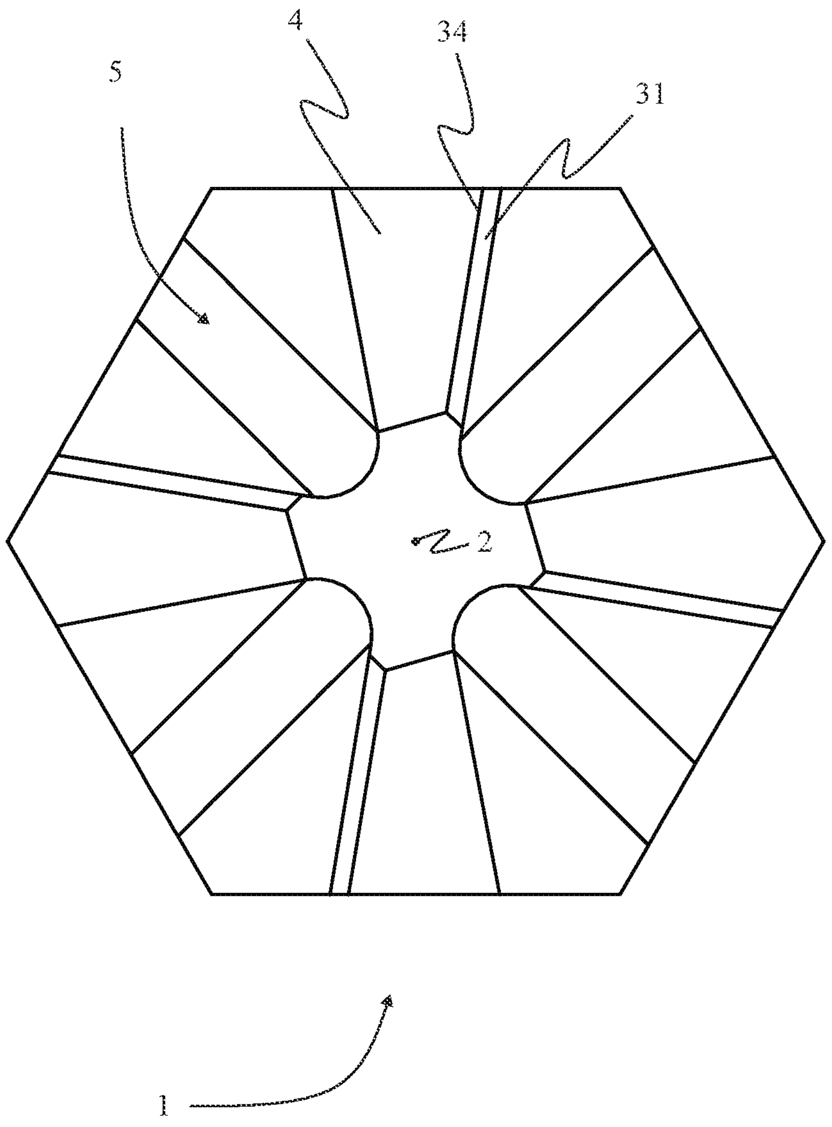
FIG. 18 is a top view of an alternative embodiment of the present invention, wherein the torque-tool body is outwardly extended from the rotational axis to the plurality of paired engagement features.
Figure 19:
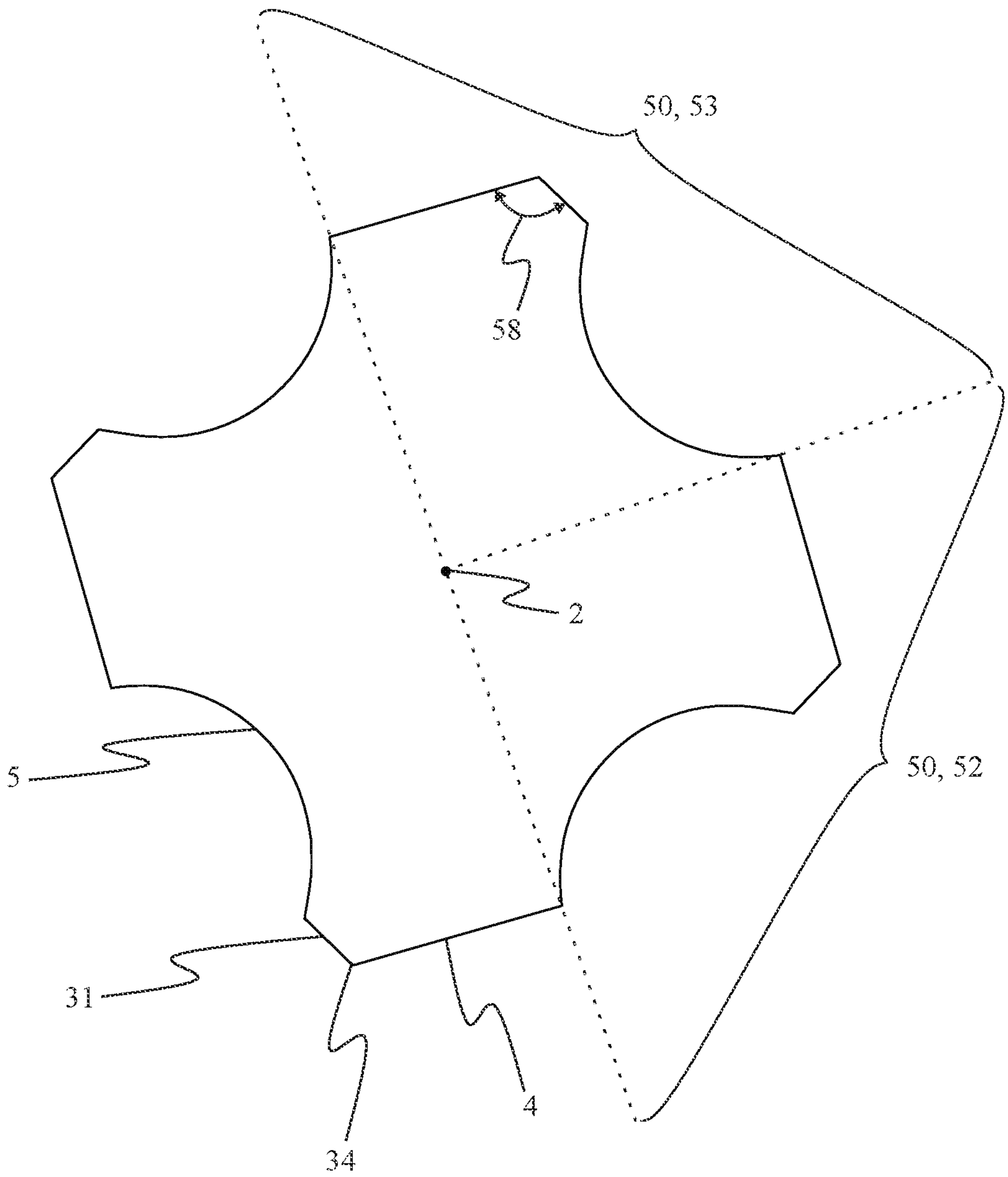
FIG. 19 is a top view of an alternative embodiment of the present invention, wherein the torque-tool body is outwardly extended from the rotational axis to the plurality of paired engagement features.
Figure 20:
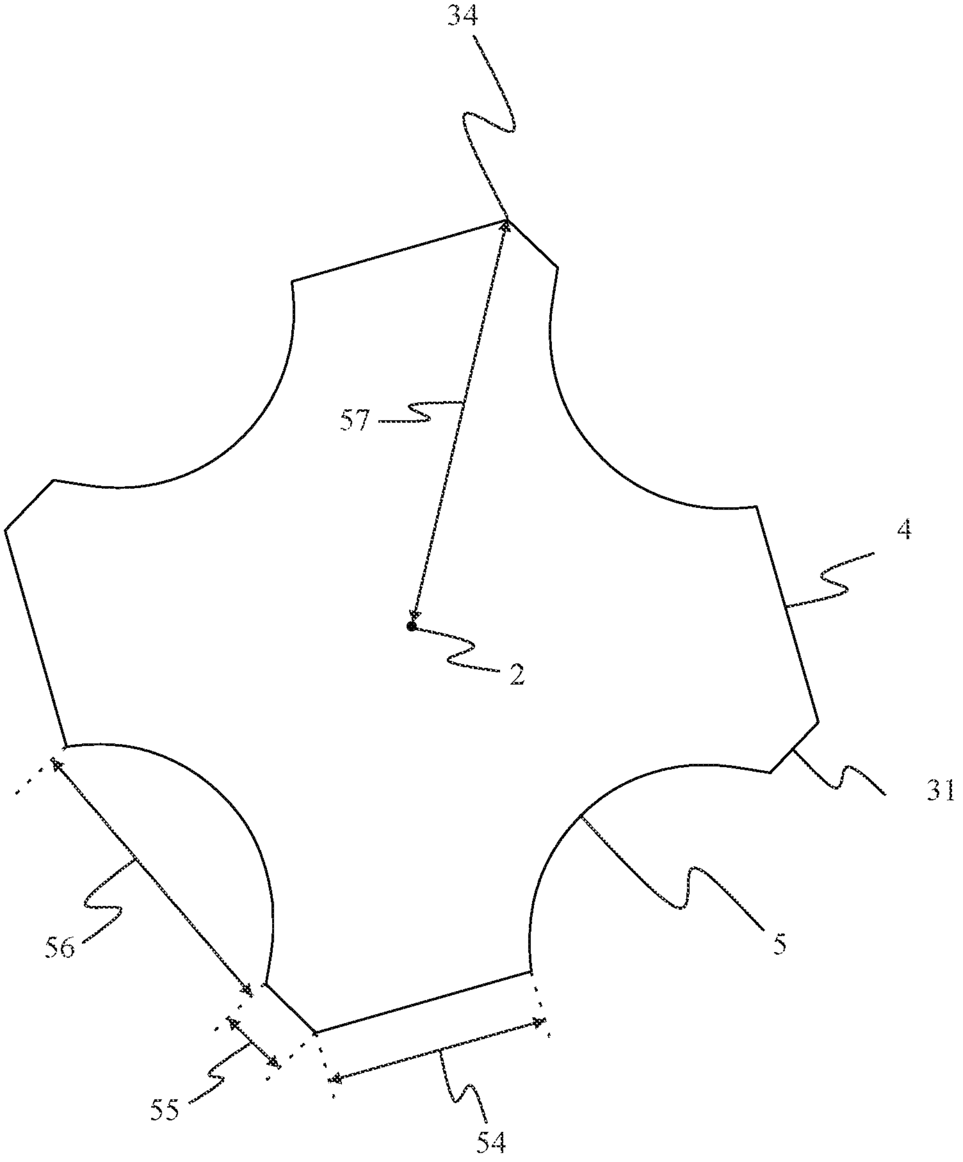
FIG. 20 is a top view of an alternative embodiment of the present invention, wherein the torque-tool body is outwardly extended from the rotational axis to the plurality of paired engagement features.

Depending upon different embodiments of the present invention, the plurality of intersection points 34 can be a sharp point or a curved section similar to a small radius. In some embodiments, as shown in FIG. 14, the plurality of intersection points 34 may incorporate a third segment 45, wherein the third segment 45 is preferably a straight, flat portion connected between the plurality of paired engagement features 3 of the arbitrary bracing section 4 and the adjacent bracing section 4. The plurality of intersection points 34 may comprise an arbitrary third segment 451 and an opposite third segment 452, wherein the arbitrary third segment 451 is oppositely positioned about the torque-tool body 1 from the opposite third segment 452. Preferably, the arbitrary third segment 451 and the opposite third segment 452 are parallel to one another, though in some embodiments, they may be offset. Furthermore, the radial distance 35 of the plurality of intersection points 34 is 4 to 12 times larger than the first-length 36 for the bracing section 4 of the first engagement feature 7 or the second-length 37 for the bracing section 4 of the second engagement feature 8 as shown in FIG. 10. The first length 36 is the length of the bracing section 4 of the first engagement feature 7 for any cross section of the torque-tool body 1 parallel to the first base 21 and the second base 22 while the second length 37 is the length of the bracing section 4 of the first engagement feature 8 for any cross section of the torque-tool body 1 parallel to the first base 21 and the second base 22. Furthermore, the radial distance 35 of the plurality of intersection points 34 is less than a radial distance 42 for the connector section 31 of the first engagement feature 7 and/or a radial distance 43 for the connector section 31 of the second engagement feature 8 as shown in FIG. 10-15. The connector section 31 is delineated as the meeting point of the cavity section 5 and the bracing section 4 of the first engagement feature 7 and as the meeting point of the cavity section 5 and the bracing section 4 of the second engagement feature 8. In some embodiments, as shown in FIG. 10-15, the first-length 36 may be equal to the second length 37 for each of the plurality of paired engagement features 3, while in other embodiments, the first length 36 may be greater than or less than the second length 37 for each of the plurality of paired engagement features 3. Depending upon different embodiments of the present invention, the connector section 31 may be a sharp point or a smooth point (curved or flat section) as preferred by the user. As shown in FIG. 15, in some embodiments, the bracing surface 4 and the connector section 31, are continuous and colinear. Further, the bracing section 4 and the connector section 31 may be continuous and colinear with a tangent line to the cavity section 5 at an intersection between the connector section 31 and the cavity section 5 for the first engagement feature 7 and the second engagement feature 8 for each of the plurality of paired engagement features 3. Furthermore, the connector section 31 is preferably a convex segment and oriented towards the rotational axis 2. However, the connector section 31 can also be a flat segment, a concave segment, or may connect with the bracing section 4 at an obtuse angle. The connector section 31 is a novel improvement to the interchange between the flat bracing section 4 and the cavity section 5, wherein the connector section 31 gives the user an additional engagement surface. The addition engagement surface delineated as the connector section 31 provides the user the option to alter the tool to a sharp connector section for greater grip, alternatively, a radial, flat, or concave surface gives the user greater surface contact when torque is applied.

As shown in FIG. 7-15 the cavity section 5 of the first engagement feature 7 and the cavity section 5 of the second engagement feature 8 are oriented away from the rotational axis 2 thus collectively delineating a radial profile, preferably a partially circular shape or an oval shape but may also be an angular profiled shape such as triangular, trapezoidal, square but not limited to these shapes. The cavity section 5 may also be a combination of shapes joined together if preferred for manufacturing purposes the shapes or components may be joined by a radial profile. The bracing section 4 of the first engagement feature 7 and the bracing section 4 of the second engagement feature 8 are oppositely positioned of each other about the cavity section 5 of the first engagement feature 7 and the cavity section 5 of the second engagement feature 8 and are oriented towards the rotational axis 2. In other words, the cavity section 5 of the first engagement feature 7 and the cavity section 5 of the second engagement feature 8 are adjacently positioned in between the bracing section 4 of the first engagement feature 7 and the bracing section 4 of the second engagement feature 8. In some embodiments of the present invention, the plurality of paired engagement features 3 can be tapered away from the rotational axis 2. In other words, an outer diameter of the plurality of paired engagement features 3 about the top surface of the torque-tool body 1 is greater than an outer diameter of the plurality of paired engagement features 3 about the attachment body 10. Furthermore, as shown in FIG. 7-15, the bracing section 4 of the first engagement feature 7 and the bracing section 4 of the second engagement feature 8 are positioned offset of each other. More specifically, the present invention further comprises a first geometric plane and a second geometric plane. The first geometric plane is positioned parallel to the bracing section 4 of the first engagement feature 7, and the second geometric plane that is positioned parallel to the bracing section 4 of the second engagement feature 8 as the first geometric plane and the second geometric plane are positioned offset of each other. In other words, the first geometric plane and the second geometric plane are not co-planar within the present invention. Specifically, the bracing section 4 of the first engagement feature 7 and the bracing section 4 of the second engagement feature 8 are not aligned with each other. While it is preferred that the bracing section 4 of the first engagement feature 7 and the bracing section 4 of the second engagement feature 8 are not aligned with each other, for some fastener profiles, a geometric plane of the bracing section 4 of the first engagement feature 7 and the bracing section 4 of the second engagement feature 8 may be aligned with each other.

In some embodiments of the present invention, the bracing section 4 may be convex or concave. Within a single embodiment, the bracing sections 4 for the plurality of paired engagement features 3 may be a mixture of concave, convex, and flat. For example, the bracing section 4 of the first engagement feature 7 may be concave while the bracing section 4 of the second engagement feature 8 may be convex. Alternatively, the bracing section 4 of the first engagement feature 7 may be flat while the bracing section 4 of the second engagement feature 8 is concave or any other combination of concave, convex, and flat bracing surfaces 4.

As noted above and shown in FIG. 11-12, the third angle 16 is delineated between the bracing section 4 of the first engagement feature 7 of the arbitrary paired engagement feature 32 and the bracing section 4 of the second engagement feature 8 of the adjacent paired engagement feature 33 for each of the plurality of paired engagement features 3. As the third angle 16 is applicable to each of the plurality of paired engagement features 3, it may also be stated that the third angle 16 is delineated between the bracing section 4 of the first engagement feature 7 of the adjacent paired engagement feature 33 and the bracing section 4 of the second engagement feature 8 of the distant paired engagement feature 30 for each of the plurality of paired engagement features 3. The third angle 16 is preferably less than 160 degrees and in some embodiments may be an acute angle less than 90 degrees. Referring to FIG. 13, the bracing section 4 of the first engagement feature 7 of the arbitrary paired engagement feature 32 may be offset from the bracing section 4 of the second engagement feature 8 of the distant paired engagement feature 30 by a fourth angle 19. In the preferred embodiment, the fourth angle 19 is less than 180 degrees, though the fourth angle 19 may be 180 degrees in some embodiments, making the bracing section 4 of the first engagement feature 7 of the arbitrary paired engagement feature 32 colinear with the bracing section 4 of the second engagement feature 8 of the distant paired engagement feature 30.

It is understood that all components described within the present application pertaining to the male embodiment of FIG. 1-6 may also be applicable to the female embodiment FIG. 7-15 of the present application even if not explicitly described as pertaining to FIG. 7-15 as all components are part of the overall invention in either a female or male configuration. It is further understood that the opposite may be true for components described as pertaining for FIG. 7-15 may also apply to FIG. 1-6.

In reference to FIG. 1-15, in some embodiments, the bracing surface 4 may comprise an intermittent sidewall. The intermittent sidewall may be placed between the plurality of sidewalls with the plurality of paired engagement features 3. The intermittent sidewalls may alternate between the plurality of paired engagement features 3 or may be opposite of each of the plurality of paired engagement features 3. A plurality of intermittent sidewalls may further be a plurality of consecutive intermittent sidewalls. In other words, more than one intermittent sidewall may be placed consecutively between the plurality of paired engagement features 3. The intermittent sidewall surface is preferably a flat surface.

Referring to FIG. 16-20, the present invention may instead comprise a plurality of individual engagement features 50 in place of the plurality of paired engagement features 3 from the previous embodiment. Each of the plurality of individual engagement features 50 are radially positioned about the rotational axis 2. The plurality of intersection points 34 is defined as the meeting point of two individual engagement features of the plurality of individual engagement features 50. In other words, an arbitrary individual engagement feature 52 from the plurality of individual engagement features 50 is connected to an adjacent individual engagement feature 53 of the plurality of individual engagement features 50 are connected to each other at an intersection point of the plurality of intersection points 34. The plurality of intersection points may be sharp, curved, flat, or otherwise shaped as previously described. As shown in FIG. 16-20, the torque-tool body is preferably outwardly extended from the rotational axis 2 to the plurality of individual engagement features 50.

Further referring to FIG. 16-20, each of the plurality of individual engagement features 50 comprises a bracing section 4, a cavity section 5, and a connector section 31. More specifically, the bracing section 4 and the cavity section 5 are adjacently connected to one another by the connector section 31. Through this orientation, the bracing section 4 of the arbitrary individual engagement feature 52 is directly connected to the cavity section 5 of the adjacent individual engagement feature 53 at one of the plurality of intersection points 34. An intersection angle 58 is delineated at the plurality of intersection points 34 between the bracing section 4 and the connector section 31. In the preferred embodiment, the intersection angle 58 is obtuse. Further, through this arrangement, the bracing section 4 of the arbitrary individual engagement feature 52 is angularly offset (not collinear) from the connector section 31 of the adjacent individual engagement feature 53. The bracing section 4 and the connector section 31 are preferably flat. Further, the cavity section 5 is preferably partially circular, though the cavity section may be any combination of flat and/or curved portions. In the preferred embodiment, the cavity section 5 is entirely concave.

The first base 21 and the second base 22 are arranged on the torque tool body such that the plurality of individual engagement features are arranged between the first base 21 and the second base 22 with the first base 21 being parallel with the second base 22. A bracing length 54 is defined as the length of the bracing section 4 and a connector length 55 is defined as the length of the connector section 31 for any cross section parallel to the first base 21 and the second base 22. For the embodiment shown in FIG. 16-20, the bracing length 54 is longer than the connector length 55 for any cross section parallel to the first base 21 and the second base 22. Further, a cavity length 56 is defined as the shortest distance from the connector section 31 of the adjacent individual engagement feature 53 to the bracing section 4 of the arbitrary individual engagement feature 52 across the cavity section 5 and an intersection distance 57 is defined as the distance from one of the plurality of intersection points 34 to the rotational axis. In the preferred embodiment, the plurality of intersection points 34 are the furthest points on the plurality of individual engagement features 50 from the rotational axis 2 for any given cross section parallel to the first base 21 and the second base 22.

In further reference to the embodiment shown in FIG. 16-20, the plurality of individual engagement features 50 may be tapered. Specifically, the bracing section 4 for each of the plurality of individual engagement features 50 may be laterally tapered from the first base 21 to the second base 22. In other words, the bracing length 54 may be smaller at the first base 21 than at the second base 22. The cavity section 5 may also be laterally tapered from the first base 21 to the second base 22. In other words, the cavity length 56 may be smaller at the first base 21 than at the second base 22. However, preferably a width length of the connector section 31 does not taper from the first base 21 to the second base 22. In other words, the connector length 55 is preferably equivalent at the first base 21 and the second base 22, notwithstanding, in some embodiments or due to manufacturing limitations, a connector length 55 may be less adjacent to the first base 21 than a connector length 55 adjacent to the second base 22. Additionally, the plurality of individual engagement features 50 may be radially tapered from the first base 21 to the second base 22. In other words, the intersection distance 57 is greater at the second base 22 than at the first base 21.

Although the invention has been explained in relation to its preferred embodiment, it is to be understood that many other possible modifications and variations can be made without departing from the spirit and scope of the invention as hereinafter claimed.

What is claimed is:

1. An anti-slip fastener remover tool comprises:
- a torque-tool body;
- a plurality of paired engagement features;
- a plurality of intersection points;
- the torque-tool body being inwardly extended from an outer wall of the torque-tool body to the plurality of paired engagement features;
- the plurality of paired engagement features comprising an arbitrary paired engagement feature and an adjacent paired engagement feature;
- each of the plurality of paired engagement features comprising a first engagement feature and a second engagement feature;
- a number of the plurality of paired engagement features being six;
- a cross section for the first engagement feature and the second engagement feature each comprising a bracing section, a cavity section, and a connector section;
- the plurality of paired engagement features being radially distributed about a rotational axis of the torque-tool body;
- a first base being an opening of the torque-tool body;
- a second base being within the torque-tool body, opposite the first base, and comprising an innermost wall;
- the plurality of paired engagement features being perimetrically connected around the first base, extending from the first base to the second base;
- each of the plurality of paired engagement features being configured to simultaneously engage about the center of a fastener lateral surface along the first base to the second base;
- each of the plurality of paired engagement features being equal in length measured along a distance parallel with the rotational axis extending from the first base to the innermost wall;
- a third angle delineated between the bracing section of the first engagement feature of the arbitrary paired engagement feature and the bracing section of the second engagement feature of the adjacent paired engagement feature being less than 180 degrees;
- the bracing section of the first engagement feature for each of the plurality of paired engagement features being connected to the cavity section of the first engagement feature by the connector section of the first engagement feature;
- the bracing section of the second engagement feature for each of the plurality of paired engagement features being connected to the cavity section of the second engagement feature by the connector section of the second engagement feature;
- the cavity section of the first engagement feature for each of the plurality of paired engagement features being adjacently connected to the cavity section of the second engagement feature of each of the plurality of paired engagement features;
- the bracing section of the first engagement feature of the arbitrary paired engagement feature being connected to the bracing section of the second engagement feature of the adjacent paired engagement feature by one of the plurality of intersection points; and
- the cavity section of the first engagement feature and the cavity section of the second engagement feature being oriented away from the rotational axis for each of the plurality of paired engagement features.

2. The anti-slip remover tool of claim 1, wherein the each of the plurality of intersection points is a sharp point.

3. The anti-slip remover tool of claim 1, wherein the each of the plurality of intersection points is a curved section.

4. The anti-slip remover tool of claim 1, further comprising:
- the plurality of intersection points each further comprising a third segment; and
- the third segment being flat.

5. The anti-slip remover tool of claim 4, further comprising:
- the plurality of intersection points comprising an arbitrary third segment and an opposite third segment; and
- the arbitrary third segment being oppositely positioned about the torque-tool body from the opposite third segment.

6. The anti-slip remover tool of claim 5, wherein the arbitrary third segment and the opposite third segment are parallel.

7. The anti-slip remover tool of claim 5, wherein the arbitrary third segment and the opposite third segment are not parallel.

8. The anti-slip remover tool of claim 1, further comprising:

the plurality of paired engagement features further comprising a distant paired engagement feature; and the bracing section of the first engagement feature of the adjacent paired engagement feature being connected to a bracing section of the second engagement feature of the distant paired engagement feature by one of the plurality of intersection points.

9. The anti-slip remover tool of claim 8, wherein the bracing section of first engagement feature of the arbitrary paired engagement feature is offset from the bracing section of the second engagement feature of the distant paired engagement feature.

10. The anti-slip remover tool of claim 1, wherein the bracing section of the first engagement feature and the second engagement feature of the plurality of paired engagement features is concave.

11. The anti-slip remover tool of claim 1, wherein the bracing section of the first engagement feature and the second engagement feature of the plurality of paired engagement features is convex.

12. The anti-slip remover tool of claim 1, wherein the connector section is colinear with the bracing section for each of the plurality of paired engagement features.

13. The anti-slip remover tool of claim 1, wherein the bracing section is colinear with a tangent line to the cavity section at an intersection of the cavity section and the connector section for each of the plurality of paired engagement features.

14. The anti-slip remover tool of claim 1, wherein the third angle is less than 90 degrees.

15. The anti-slip remover tool of claim 1, further comprising:

a first length being a length of the bracing section of the first engagement feature for any cross section of the torque-tool body parallel to the first base and the second base;

a second length being a length of the bracing section of the second engagement feature for any cross section of the torque-tool body parallel to the first base and the second base; and the first length being equal to the second length.

16. The anti-slip remover tool of claim 1, further comprising:

a first length being a length of the bracing section of the first engagement feature for any cross section of the torque-tool body parallel to the first base and the second base;

a second length being a length of the bracing section of the second engagement feature for any cross section of the torque-tool body parallel to the first base and the second base; and the first length being greater than or less than the second length.

17. The anti-slip fastener remover tool as claimed in claim 1, wherein the connector section is a concave segment, wherein the connector section is oriented toward the rotational axis.

18. The anti-slip fastener remover tool as claimed in claim 1, wherein the bracing section of the first engagement feature and the bracing section of the second engagement feature are positioned offset of each other.

19. The anti-slip fastener remover tool as claimed in claim 1, comprising:

an engagement bore;

an attachment body;

the attachment body being centrally positioned around and along the rotational axis;

the attachment body being adjacently connected to the torque-tool body; and the engagement bore traversing into the attachment body along the rotational axis, opposite of the torque-tool body.

20. The anti-slip fastener remover tool as claimed in claim 1, comprising:

a radial distance of the plurality of intersection points being a distance between the rotational axis and the plurality of intersection points for any cross section of the torque-tool body parallel to the first base and the second base;

a radial distance of the connector section of the first engagement feature being a shortest distance between the rotational axis and the connector section of the first engagement feature for any cross section of the torque-tool body parallel to the first base and the second base; and the radial distance of the plurality of intersection points being less than the radial distance of the connector section of the first engagement feature.

* * * * *